(12) United States Patent
Vinegar et al.

(10) Patent No.: US 6,715,550 B2
(45) Date of Patent: Apr. 6, 2004

(54) CONTROLLABLE GAS-LIFT WELL AND VALVE

(75) Inventors: Harold J. Vinegar, Houston, TX (US); Robert Rex Burnett, Katy, TX (US); William Mountjoy Savage, Houston, TX (US); Fred Gordon Carl, Jr., Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/768,705

(22) Filed: Jan. 24, 2001

(65) Prior Publication Data

US 2003/0164240 A1 Sep. 4, 2003

Related U.S. Application Data

(60) Provisional application No. 60/177,999, filed on Jan. 24, 2000, provisional application No. 60/186,376, filed on Mar. 2, 2000, provisional application No. 60/178,000, filed on Jan. 24, 2000, provisional application No. 60/186,380, filed on Mar. 2, 2000, provisional application No. 60/186,505, filed on Mar. 2, 2000, provisional application No. 60/178,001, filed on Jan. 24, 2000, provisional application No. 60/177,883, filed on Jan. 24, 2000, provisional application No. 60/177,998, filed on Jan. 24, 2000, provisional application No. 60/177,997, filed on Jan. 24, 2000, provisional application No. 60/181,322, filed on Feb. 9, 2000, provisional application No. 60/186,504, filed on Mar. 2, 2000, provisional application No. 60/186,379, filed on Mar. 2, 2000, provisional application No. 60/186,394, filed on Mar. 2, 2000, provisional application No. 60/186,382, filed on Mar. 2, 2000, provisional application No. 60/186,503, filed on Mar. 2, 2000, provisional application No. 60/186,527, filed on Mar. 2, 2000, provisional application No. 60/186,393, filed on Mar. 2, 2000, provisional application No. 60/186,394, filed on Mar. 2, 2000, provisional application No. 60/186,531, filed on Mar. 2, 2000, provisional application No. 60/186,377, filed on Mar. 2, 2000, provisional application No. 60/186,381, filed on Mar. 2, 2000, and provisional application No. 60/186,378, filed on Mar. 2, 2000.

(51) Int. Cl.$^7$ .................. E21B 43/00; E21B 43/12; E21B 47/00; E21B 47/06

(52) U.S. Cl. .................. 166/250.15; 166/53; 166/66; 166/66.7; 166/68.5; 166/106; 137/155; 340/853.3; 340/854.4; 340/854.5

(58) Field of Search .................. 166/53, 66, 66.4, 166/66.6, 66.7, 68.5, 106, 250.07, 250.15, 372, 373; 137/155; 340/853.3, 854.4, 854.5, 856.3

(56) References Cited

U.S. PATENT DOCUMENTS 525,663 A 9/1894 Mottinger (List continued on next page.)

FOREIGN PATENT DOCUMENTS

EP 28296 5/1981

(List continued on next page.)

OTHER PUBLICATIONS

Brown. Connolizo and Robertson, West Texas Oil Lifting Short Course and H.W. Winkler, "Misunderstood of overlooked Gas–Lift Design and Equipment Considerations," SPE, p. 351 (1994).

(List continued on next page.)

*Primary Examiner*—George Suchfield

(57) ABSTRACT

A gas-lift well having a controllable gas-lift valve is provided. The well uses the tubing and casing to communicate with and power the controllable valve from the surface. Induction chokes at the surface and downhole electrically isolate the tubing from the casing. A high band-width, adaptable communication system is used to communicate between the controllable valve and the surface. Additional sensors, such as pressure, temperature, and acoustic sensors, may be provided downhole to more accurately assess downhole conditions. The controllable valve is varied opened or closed, depending on downhole conditions, oil production, gas usage and availability, to optimize production and assist in unloading. While conventional, bellows-type, gas-lift valves frequently fail and leak—often undetected—the controllable valve hereof permits known precise operation and concomitant control of the gas-lift well.

68 Claims, 9 Drawing Sheets

U.S. PATENT DOCUMENTS

| | | | |
|---|---|---|---|
| 2,917,004 A | | 12/1959 | Davis et al. |
| 3,083,771 A | | 4/1963 | Chapman |
| 3,247,904 A | | 4/1966 | Wakefield, Jr. |
| 3,427,989 A | * | 2/1969 | Bostock et al. ............. 137/155 |
| 3,566,963 A | | 3/1971 | Blackledge ................. 166/189 |
| 3,602,305 A | | 8/1971 | Kisling, III ................. 116/134 |
| 3,732,728 A | | 5/1973 | Fitzpatrick ................... 73/151 |
| 3,814,545 A | | 6/1974 | Waters ......................... 417/90 |
| 3,837,618 A | | 9/1974 | Juhel ........................... 251/129 |
| 3,980,826 A | | 9/1976 | Widmer ....................... 178/68 |
| 4,068,717 A | | 1/1978 | Needham .................... 166/272 |
| 4,295,795 A | * | 10/1981 | Gass et al. .................. 137/155 |
| 4,393,485 A | | 7/1983 | Redden ........................ 367/25 |
| 4,468,665 A | | 8/1984 | Thawley et al. ............ 340/856 |
| 4,545,731 A | | 10/1985 | Canalizo et al. ............ 417/86 |
| 4,576,231 A | | 3/1986 | Dowling et al. ............ 166/248 |
| 4,578,675 A | | 3/1986 | MacLeod .................... 340/855 |
| 4,596,516 A | * | 6/1986 | Scott et al. .................. 166/265 |
| 4,648,471 A | | 3/1987 | Bordon ....................... 175/4.55 |
| 4,662,437 A | | 5/1987 | Renfro ....................... 166/65.1 |
| 4,681,164 A | | 7/1987 | Stacks ......................... 166/304 |
| 4,709,234 A | | 11/1987 | Forehand et al. ........... 340/856 |
| 4,738,313 A | | 4/1988 | McKee ....................... 166/372 |
| 4,739,325 A | | 4/1988 | MacLeod .................... 340/854 |
| 4,839,644 A | | 6/1989 | Safinya et al. .............. 340/854 |
| 4,886,114 A | * | 12/1989 | Perkins et al. ............. 166/66.7 |
| 4,901,069 A | | 2/1990 | Veneruso .................... 340/853 |
| 4,972,704 A | | 11/1990 | Wellington ................... 73/151 |
| 4,981,173 A | * | 1/1991 | Perkins et al. ............. 166/66.7 |
| 5,001,675 A | | 3/1991 | Woodward .................. 367/13 |
| 5,008,664 A | | 4/1991 | More et al. ................. 340/854 |
| 5,130,706 A | | 7/1992 | Van Steenwyk ......... 340/854.6 |
| 5,134,285 A | | 7/1992 | Perry et al. ................. 250/269 |
| 5,160,925 A | | 11/1992 | Dailey et al. ............ 340/853.3 |
| 5,162,740 A | | 11/1992 | Jewell ......................... 324/340 |
| 5,172,717 A | * | 12/1992 | Boyle et al. ................. 137/155 |
| 5,176,164 A | * | 1/1993 | Boyle .......................... 137/155 |
| 5,230,383 A | | 7/1993 | Pringle et al. ............. 166/66.4 |
| 5,246,860 A | | 9/1993 | Hutchins et al. .............. 436/27 |
| 5,251,328 A | | 10/1993 | Shaw ........................... 455/73 |
| 5,257,663 A | | 11/1993 | Pringle et al. ............. 166/66.4 |
| 5,267,469 A | | 12/1993 | Espinoza .................... 73/40.5 |
| 5,278,758 A | | 1/1994 | Perry et al. ................. 364/422 |
| 5,353,627 A | | 10/1994 | Diatschenko et al. ...... 73/19.03 |
| 5,358,035 A | | 10/1994 | Grudzinski ................. 166/53 |
| 5,367,694 A | | 11/1994 | Ueno ........................... 395/800 |
| 5,394,141 A | | 2/1995 | Soulier .................... 340/854.4 |
| 5,425,425 A | | 6/1995 | Bankston et al. ........... 166/377 |
| 5,447,201 A | | 9/1995 | Mohn ......................... 166/375 |
| 5,458,200 A | * | 10/1995 | Lagerlef et al. ............ 166/372 |
| 5,467,083 A | | 11/1995 | McDonald et al. ...... 340/854.6 |
| 5,473,321 A | | 12/1995 | Goodman et al. ....... 340/854.9 |
| 5,493,288 A | | 2/1996 | Henneuse ................ 340/854.4 |
| 5,531,270 A | | 7/1996 | Fletcher et al. ............... 166/53 |
| 5,561,245 A | | 10/1996 | Georgi et al. ............ 73/152.02 |
| 5,574,374 A | | 11/1996 | Thompson et al. ......... 324/338 |
| 5,576,703 A | | 11/1996 | MacLeod ................. 340/854.4 |
| 5,587,707 A | | 12/1996 | Dickie et al. .......... 340/870.09 |
| 5,592,438 A | | 1/1997 | Rorden et al. ................ 367/83 |
| 5,662,165 A | | 9/1997 | Tubel et al. ........... 166/250.01 |
| 5,723,781 A | | 3/1998 | Pruett et al. ............. 73/152.18 |
| 5,730,219 A | | 3/1998 | Tubel et al. ............. 66/250.01 |
| 5,745,047 A | * | 4/1998 | Van Gisbergen et al. 340/853.1 |
| 5,782,261 A | | 7/1998 | Becker et al. ............... 137/155 |
| 5,797,453 A | | 8/1998 | Hisaw ..................... 166/117.5 |
| 5,881,807 A | | 3/1999 | Boe et al. ................... 166/100 |
| 5,883,516 A | | 3/1999 | Van Steenwyk et al. .... 324/366 |
| 5,887,657 A | | 3/1999 | Bussear et al. ............. 166/336 |
| 5,896,924 A | * | 4/1999 | Carmody et al. ........... 137/155 |
| 5,934,371 A | | 8/1999 | Bussear et al. ................ 166/53 |
| 5,937,945 A | | 8/1999 | Bussear et al. ........ 166/250.15 |
| 5,941,307 A | | 8/1999 | Tubel .......................... 166/313 |
| 5,955,666 A | | 9/1999 | Mullins ...................... 73/52.18 |
| 5,959,499 A | | 9/1999 | Khan et al. .................. 330/149 |
| 5,960,883 A | | 10/1999 | Tubel et al. ................. 166/313 |
| 5,963,090 A | | 10/1999 | Fukuchi ...................... 330/149 |
| 5,971,072 A | | 10/1999 | Huber et al. ................ 166/297 |
| 5,975,204 A | | 11/1999 | Tubel et al. ........... 166/250.15 |
| 5,995,020 A | | 11/1999 | Owens et al. ............ 340/854.9 |
| 6,012,015 A | | 1/2000 | Tubel ............................. 702/6 |
| 6,012,016 A | | 1/2000 | Bilden et al. ................. 702/12 |
| 6,070,608 A | | 6/2000 | Pringle ....................... 137/155 |
| 6,123,148 A | | 9/2000 | Oneal ......................... 166/118 |
| 6,148,915 A | | 11/2000 | Mullen et al. .............. 166/278 |
| 6,192,983 B1 | * | 2/2001 | Neuroth et al. ........ 166/250.15 |
| 6,208,586 B1 | | 3/2001 | Rorden et al. ................ 367/35 |

FOREIGN PATENT DOCUMENTS

| | | | |
|---|---|---|---|
| EP | 339825 | 11/1989 | |
| EP | 492856 A2 | 7/1992 | |
| EP | 641916 A2 | 3/1995 | |
| EP | 681090 A2 | 11/1995 | |
| EP | 697500 A2 | 2/1996 | |
| EP | 721053 | 7/1996 | |
| EP | 732053 A1 | 9/1996 | |
| EP | 295178 | 12/1998 | |
| EP | 919696 A2 | 6/1999 | |
| EP | 922835 A3 | 6/1999 | |
| EP | 930518 A2 | 7/1999 | |
| EP | 964134 | 12/1999 | |
| EP | 972909 A2 | 1/2000 | |
| EP | 999341 A2 | 5/2000 | |
| FR | 2677134 | 12/1992 | |
| GB | 2083321 A | 3/1982 | |
| GB | 2325949 A | 12/1998 | |
| GB | 2327695 | 2/1999 | |
| GB | 2338253 A | 12/1999 | |
| WO | 80/00727 | 4/1980 | |
| WO | 93/26115 | 12/1993 | |
| WO | 96/00836 | 1/1996 | |
| WO | 96/24747 | 8/1996 | |
| WO | 97/16751 | 5/1997 | |
| WO | PCT/EP97/01621 | 9/1997 | |
| WO | 97/37103 | 10/1997 | |
| WO | 98/20233 | 5/1998 | |
| WO | 99/37044 | 7/1999 | |
| WO | 99/57417 | 11/1999 | |
| WO | 99/60247 | 11/1999 | ........... E21B/43/12 |
| WO | 00/04275 | 1/2000 | |
| WO | 00/37770 | 6/2000 | |
| WO | 01/20126 A2 | 3/2001 | |
| WO | 01/55555 A1 | 8/2001 | |

OTHER PUBLICATIONS

Der Spek, Alex, and Aliz Thomas, "Neural–Net Identification of Flow Regime with Band Spectra of Flow–Generated Sound", SPE Reservoir Eva. & Eng.2 (6) Dec. 1999, pp. 489–498.

Sakata et al., "Performance Analysis of Long Distance Transmitting of Magnetic Signal on Cylindrical Steel Rod", IEEE Translation Journal on magnetics in Japan, vol. 8, No. 2. Feb. 1993 , , pps. 102–106.

Otis Engineering, Aug. 1980, "Heavy Crude Lift System", Field Development Report, OEC 5228, Otis Corp., Dallas, Texas, 1980.

Search Report dated Dec. 6, 2001.

* cited by examiner

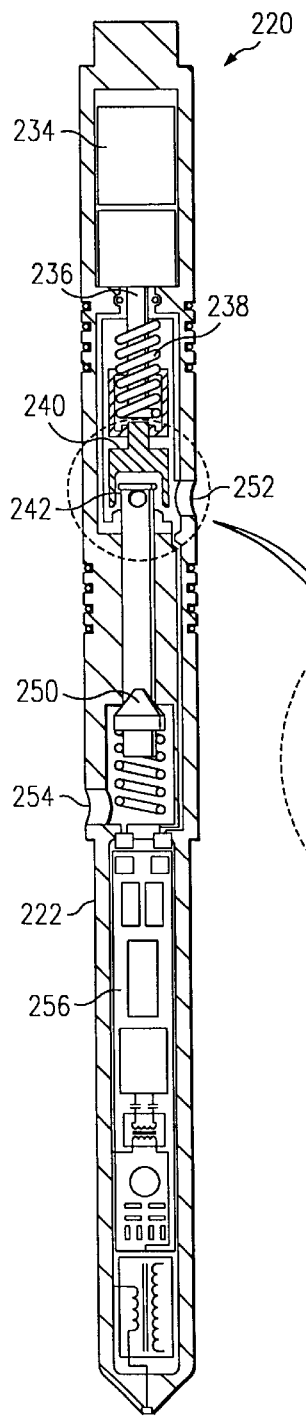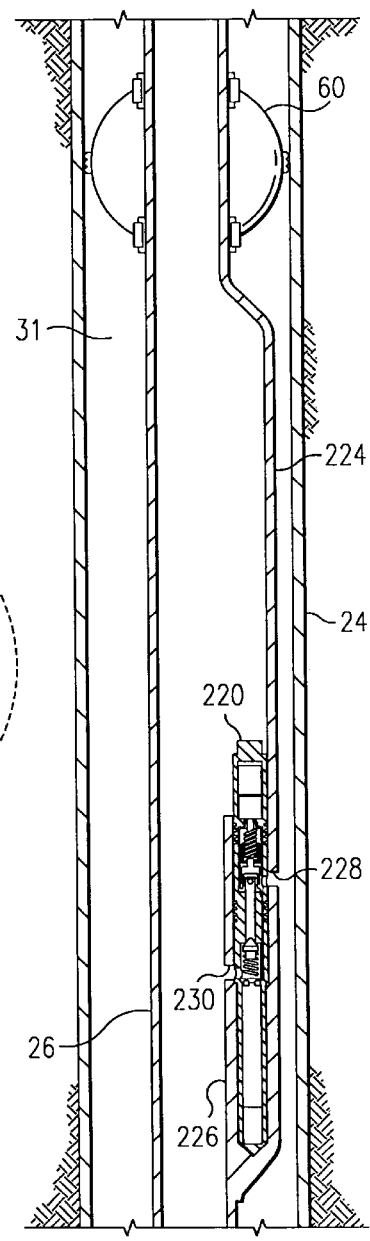
FIG. 5A
FIG. 5B
FIG. 5C

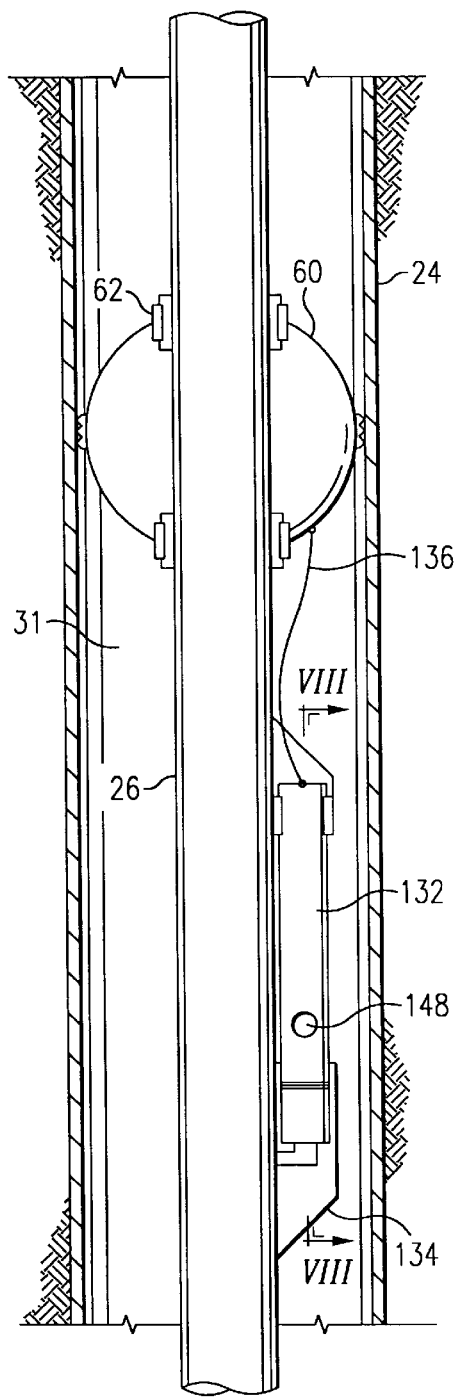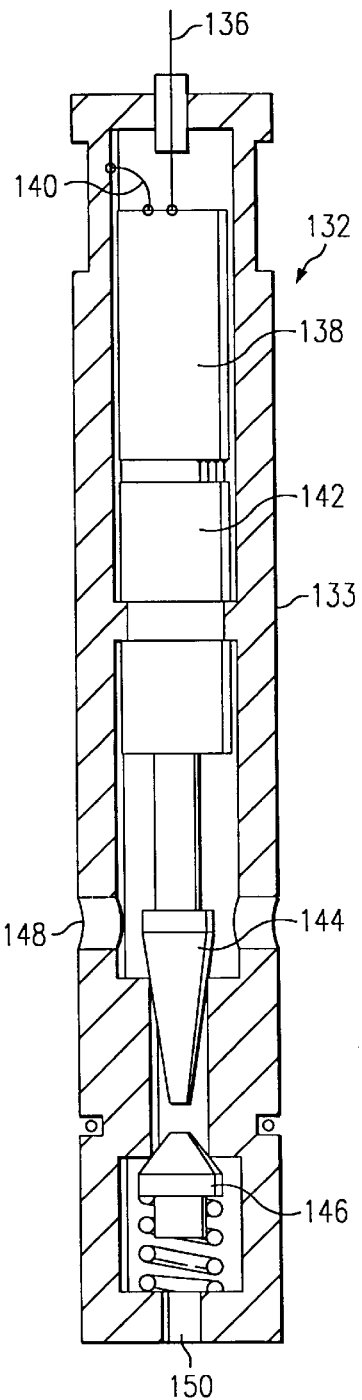
FIG. 7
FIG. 8

CONTROLLABLE GAS-LIFT WELL AND VALVE

CROSS-REFERENCES TO RELATED APPLICATIONS

This application claims the benefit of the U.S. Provisional Applications in the following table, all of which are hereby incorporated by reference:

| U.S. PROVISIONAL APPLICATIONS | | | |
|---|---|---|---|
| T&K # | Serial Number | Title | Filing Date |
| TN 1599 | 60/177,999 | Toroidal Choke Inductor for Wireless Communication and Control | Jan. 24, 2000 |
| TH 1599x | 60/186,376 | Toroidal Choke Inductor for Wireless Communication and Control | Mar. 2, 2000 |
| TH 1600 | 60/178,000 | Ferromagnetic Choke in Wellhead | Jan. 24, 2000 |
| TH 1600x | 60/186,380 | Ferromagnetic Choke in Wellhead | Mar. 2, 2000 |
| TH 1601 | 60/186,505 | Reservoir Production Control from Intelligent Well Data | Mar. 2, 2000 |
| TH 1602 | 60/178,001 | Controllable Gas-Lift Well and Valve | Jan. 24, 2000 |
| TH-1603 | 60/177,883 | Permanent, Downhole, Wireless, Two-Way Telemetry Backbone Using Redundant Repeater, Spread Spectrum Arrays | Jan. 24, 2000 |
| TH 1668 | 60/177,998 | Petroleum Well Having Downhole Sensors, Communication, and Power | Jan. 24 2000 |
| TH 1669 | 60/177,997 | System and Method for Fluid Flow Optimization | Jan. 24, 2000 |
| TS6185 | 60/181,322 | Optimal Predistortion in Downhole Communications System | Feb. 9, 2000 |
| TH 1671 | 60/186,504 | Tracer Injection in a Production Well | Mar. 2, 2000 |
| TH 1672 | 60/186,379 | Oilwell Casing Electrical Power Pick-Off Points | Mar. 2, 2000 |
| TH 1673 | 60/186,394 | Controllable Production Well Packer | Mar. 2, 2000 |
| TH 1674 | 60/186,382 | Use of Downhole High Pressure Gas in a Gas Lift Well | Mar. 2, 2000 |
| TH 1675 | 60/186,503 | Wireless Smart Well Casing | Mar. 2, 2000 |
| TH 1677 | 60/186,527 | Method for Downhole Power Management Using Energization from Distributed Batteries or Capacitors with Reconfigurable Discharge | Mar. 2, 2000 |
| TH 1679 | 60/186,393 | Wireless Downhole Well Interval Inflow and Injection Control | Mar. 2, 2000 |
| TH 1681 | 60/186,394 | Focused Through-Casing Resistivity Measurement | Mar. 2, 2000 |
| TH 1704 | 60/186,531 | Downhole Rotary Hydraulic Pressure for Valve Actuation | Mar. 2, 2000 |
| TH 1705 | 60/186,377 | Wireless Downhole Measurement and Control For Optimizing Gas Lift Well and Field Performance | Mar. 2, 2000 |
| TH 1722 | 60/186,381 | Controlled Downhole Chemical Injection | Mar. 2, 2000 |
| TH 1723 | 60/186,378 | Wireless Power and Communications Cross-Bar Switch | Mar. 2, 2000 |

The current application shares some specification and figures with the following commonly owned and concurrently filed applications in the following table, all of which are hereby incorporated by reference:

| COMMONLY OWNED AND CONCURRENTLY FILED U.S. PATENT APPLICATIONS | | | |
|---|---|---|---|
| T&K # | Serial Number | Title | Filing Date |
| TH 1599ff | 09/769,047 | Choke Inductor for Wireless Communications and Control | Jan. 24, 2001 |
| TH 1600ff | 09/769,048 | Induction Choke for Power Distribution in Piping Structure | Jan. 24, 2001 |
| TH 1603ff | 09/768,655 | Permanent Downhole, Wireless, Two-Way Telemetry Backbone Using Redundant Repeater | Jan. 24, 2001 |
| TH 1668ff | 09/769,046 | Petroleum Well Having Downhole Sensors, Communication, and Power | Jan. 24, 2001 |
| TH 1669ff | 09/768,656 | System and Method for Fluid Flow Optimization | Jan. 24, 2001 |

BACKGROUND OF THE INVENTION

1. Field of the Invention

The present invention relates generally to a gas-lift well having a controllable gas-lift valve, and in particular, to a controllable gas-lift valve which communicates with the surface and is powered using the tubing string and casing as the conductor.

2. Description of Related Art

Gas-lift wells have been in use since the 1800's and have proven particularly useful in increasing efficient rates of oil production where the reservoir natural lift is insufficient (see Brown, Connolizo and Robertson, *West Texas Oil Lifting Short Course* and H. W. Winkler, *Misunderstood or Overlooked Gas-lift Design and Equipment Considerations*, SPE, p. 351 (1994)). Typically, in a gas-lift oil well, natural gas produced in the oil field is compressed and injected in an annular space between the casing and tubing and is directed from the casing into the tubing to provide a "lift" to the tubing fluid column for production of oil out of the tubing. Although the tubing can be used for the injection of the lift-gas and the annular space used to produce the oil, this is rare in practice. Initially, the gas-lift wells simply injected the gas at the bottom of the tubing, but with deep wells this requires excessively high kick off pressures. Later, methods were devised to inject the gas into the tubing at various depths in the wells to avoid some of the problems associated with high kick off pressures (see U.S. Pat. No. 5,267,469).

The most common type of gas-lift well uses mechanical, bellows-type gas-lift valves attached to the tubing to regulate the flow of gas from the annular space into the tubing string (see U.S. Pat. Nos. 5,782,261 and 5,425,425). In a typical bellows-type gas-lift valve, the bellows is preset or pre-charged to a certain pressure such that the valve permits communication of gas out of the annular space and into the tubing at the pre-charged pressure. The pressure charge of each valve is selected by a well engineer depending upon the position of the valve in the well, the pressure head, the physical conditions of the well downhole, and a variety of other factors, some of which are assumed or unknown, or will change over the production life of the well.

Referring to FIG. 1 in the drawings, a typical bellows-type gas-lift valve 310 has a pre-charge cylinder 312, a metal bellows 314, and entry ports 316 for communicating gas from the annular space outside the tubing string. Gas-lift valve 310 also includes a ball 318 that sealingly engages a valve seat 319 when valve 310 is in a closed position. When gas-lift valve 310 is in an open position, ball 318 no longer engages valve seat 319, thereby allowing gas from the annular space to pass through entry port 316, past ball 318, and through exit port 320. Several problems are common with bellows-type gas-lift valves. First, the bellows often loses its pre-charge, causing the valve to fail in the closed position or changing its setpoint to operate at other than the design goal, and exposure to overpressure causes similar problems. Another common failure is erosion around valve seat 319 and deterioration of the ball stem in the valve. This leads to partial failure of the valve or at least inefficient production. Because the gas flow through a gas-lift valve is often not continuous at a steady state, but rather exhibits a certain amount of hammer and chatter as ball 318 rapidly opens and closes, ball and valve seat degradation are common, leading to valve leakage. Failure or inefficient operation of bellows-type valves leads to corresponding inefficiencies in operation of a typical gas-lift well. In fact, it is estimated that well production is at least 5–15% less than optimum because of valve failure or operational inefficiencies. Fundamentally these difficulties are caused by the present inability to monitor, control, or prevent instabilities, since the valve characteristics are set at design time, and even without failure they cannot be easily changed after the valve is installed in the well.

Side-pocket mandrels coupled to the tubing string are known for receiving wireline insertable and retrievable gas-lift valves. Many gas-lift wells have gas-lift valves incorporated as an integral part of the tubing string, typically mounted to a pipe section. However, wireline replaceable side pocket mandrel type of gas-lift valves have many advantages and are quite commonly used (see U.S. Pat. Nos. 5,782,261 and 5,797,453). Gas-lift valves placed in a side pocket mandrel can be inserted and removed using a wireline and workover tool either in top or bottom entry. In lateral and horizontal boreholes, coiled tubing is used for insertion and removal of the gas-lift valves. It is common practice in oilfield production to shut off production of the well periodically and use a wireline to replace gas-lift valves. However, an operator often does not have a good estimate of which valves in the well have failed or degraded and need to be replaced.

It would, therefore, be a significant advantage if a system and method were devised which overcame the inefficiency of conventional bellows-type gas-lift valves. Several methods have been devised to place controllable valves downhole on the tubing string but all such known devices typically use an electrical cable or hydraulic line disposed along the tubing string to power and communicate with the gas-lift valves. It is, of course, highly undesirable and in practice difficult to use a cable along the tubing string either integral with the tubing string or spaced in the annulus between the tubing string and the casing because of the number of failure mechanisms present in such a system. The use of a cable presents difficulties for well operators while assembling and inserting the tubing string into a borehole. Additionally, the cable is subjected to corrosion and heavy wear due to movement of the tubing string within the borehole. An example of a downhole communication system using a cable is shown in PCT/EP97/01621.

U.S. Pat. No. 4,839,644 describes a method and system for wireless two-way communications in a cased borehole having a tubing string. However, this system describes a communication scheme for coupling electromagnetic energy in a transverse electric mode (TEM) using the annulus between the casing and the tubing. The system requires a toroidal antenna to launch or receive in a TEM mode, and the patent suggests an insulated wellhead. The inductive coupling of the system requires a substantially nonconductive fluid such as crude oil in the annulus between the casing and the tubing, and this oil must be of a higher density that brine so that leaked brine does not gather at the bottom of the annulus. This system does not speak to the issue of providing power to the downhole module. The invention described in U.S. Pat. No. 4,839,644 has not been widely adopted as a practical scheme for downhole two-way communication because it is expensive, has problems with brine leakage into the casing, and is difficult to use. Another system for downhole communication using mud pulse telemetry is described in U.S. Pat. Nos. 4,648,471 and 5,887,657. Although mud pulse telemetry can be successful at low data rates, it is of limited usefulness where high data rates are required or where it is undesirable to have complex, mud pulse telemetry equipment downhole. Other methods of communicating within a borehole are described in U.S. Pat. Nos. 4,468,665; 4,578,675; 4,739,325; 5,130,706; 5,467,083; 5,493,288; 5,574,374; 5,576,703; and 5,883,516.

It would, therefore, be a significant advance in the operation of gas-lift wells if an alternative to the conventional bellows type valve were provided, in particular, if the tubing string and the casing could be used as the communication and power conductors to control and operate a controllable gas-lift valve.

All references cited herein are incorporated by reference to the maximum extent allowable by law. To the extent a reference may not be fully incorporated herein, it is incorporated by reference for background purposes and indicative of the knowledge of one of ordinary skill in the art.

SUMMARY OF THE INVENTION

The problems outlined above are largely solved by the electrically controllable gas-lift well in accordance with the present invention. Broadly speaking, the controllable gas-lift well includes a cased wellbore having a tubing string positioned and longitudinally extending within the casing. The position of the tubing string within the casing creates an annulus between the tubing string and the casing. A controllable gas-lift valve is coupled to the tubing to control gas injection between the interior and exterior of the tubing, more specifically, between the annulus and the interior of the tubing. The controllable gas-lift valve is powered and controlled from the surface to regulate the fluid communication between the annulus and the interior of the tubing. Communication signals and power are sent from the surface using the tubing and casing as conductors. The power is preferably a low voltage AC at conventional power frequencies in the range 50 to 400 Hertz, but in certain embodiments DC power may also be used.

In more detail, a surface computer having a modem imparts a communication signal to the tubing, and the signal is received by a modem downhole connected to the controllable gas-lift valve. Similarly, the modem downhole can communicate sensor information to the surface computer. Further, power is input into the tubing string and received downhole to control the operation of the controllable gas-lift valve. Preferably, the casing is used as the ground return conductor. Alternatively, a distant ground may be used as the electrical return. In a preferred embodiment, the controllable gas-lift valve includes a motor which operates to insert and withdraw a cage trim valve from a seat, regulating the gas injection between the annulus and the interior of the tubing, or other means for controlling gas flow rate.

In enhanced forms, the controllable gas-lift well includes one or more sensors downhole which are preferably in contact with the downhole modem and communicate with the surface computer, although downhole processing may also be used to minimize required communications data rate, or even to make the downhole system autonomous. Such sensors as temperature, pressure, hydrophone, microphone, geophone, valve position, flow rates, and differential pressure gauges are advantageously used in many situations. The sensors supply measurements to the modem for transmission to the surface or directly to a programmable interface controller operating the controllable gas-lift valve for controlling the fluid flow through the gas-lift valve.

Preferably, ferromagnetic chokes are coupled to the tubing to act as a series impedance to current flow on the tubing. In a preferred form, an upper ferromagnetic choke is placed around the tubing below the tubing hanger, and the current and communication signals are imparted to the tubing below the upper ferromagnetic choke. A lower ferromagnetic choke is placed downhole around the tubing with the controllable gas-lift valve electrically coupled to the tubing above the lower ferromagnetic choke, although the controllable gas-lift valve may be mechanically coupled to the tubing below the lower ferromagnetic choke. It is desirable to mechanically place the operating controllable gas-lift valve below the lower ferromagnetic choke so that the borehole fluid level is below the choke.

Preferably, a surface controller (computer) is coupled via a surface master modem and the tubing to the downhole slave modem of the controllable gas-lift valve. The surface computer can receive measurements from a variety of sources, such as downhole and surface sensors, measurements of the oil output, and measurements of the compressed gas input to the well (flow and pressure). Using such measurements, the computer can compute an optimum position of the controllable gas-lift valve, more particularly, the optimum amount of the gas injected from the annulus inside the casing through the controllable valve into the tubing. Additional enhancements are possible, such as controlling the amount of compressed gas input into the well at the surface, controlling back pressure on the wells, controlling a porous frit or surfactant injection system to foam the oil, and receiving production and operation measurements from a variety of other wells in the same field to optimize the production of the field.

The ability to actively monitor current conditions downhole, coupled with the ability to control surface and downhole conditions, has many advantages in a gas-lift well.

Gas-lift wells have four broad regimes of fluid flow, for example bubbly, Taylor, slug and annular flow. The downhole sensors of the present invention enable the detection of flow regime. The above referenced control mechanisms-surface computer, controllable valves, gas input, surfactant injection, etc.—provide the ability to attain and maintain the desired flow regime. In general, well tests and diagnostics can be performed and analyzed continuously and in near real time.

In one embodiment, all of the gas-lift valves in the well are of the controllable type in accordance with the present invention. It is desirable to lift the oil column from a point in the borehole as close as possible to the production packer. That is, the lowest gas-lift valve is the primary valve in production. The upper gas-lift valves are used for annular unloading of the well during production initiation. In conventional gas-lift wells, these upper valves have bellows pre-set with a margin of error to ensure the valves close after unloading. This means operating pressures that permit closing of unloading valves as each successive valve is uncovered. These margins result in the inability to use the full available pressure to lift at maximum depth during production: lift pressure is lost downhole to accommodate the design margin offset at each valve. Further, such conventional valves often leak and fail to fully close. Use of the controllable valves of the present invention overcomes such shortcomings.

In an alternate embodiment, a number of conventional mechanical bellows-type gas-lift valves are longitudinally spaced on the tubing string in a conventional manner. The lower-most valve is preferably a bellows-type valve which aids in unloading of the well in the normal manner. The bellows-type valve's pre-charged pressure is set normally. That is, the unloading pushes annular fluid into the tubing through successively deeper gas-lift valves until the next to the last gas-lift valve is cleared by the fluid column. Production is then maintained by gas injection through a controllable gas-lift valve located on the tubing string, which as outlined above receives power and communication signals through its connection to the tubing and a grounding centralizer. While only one controllable gas-lift valve is described, more can be used if desired, depending upon the characteristics of a particular well. If the controllable gas-lift valve fails, the production is diverted through the lowest manual valve above the controllable gas-lift valve.

Construction of such a controllable gas-lift well is designed to be as similar to conventional construction methodology as possible. That is, after casing the well, a packer is typically set above the production zone. The tubing string is then fed through the casing into communication with the production zone. As the tubing string is made up at the surface, a lower ferromagnetic choke is placed around one of the conventional tubing string sections for positioning above the bottom valve, or a pre-assembled joint prepared with the valve, electronics module, and choke may be be used. In the sections of the tubing string where it is desired, a gas-lift valve is coupled to the string. In a preferred form the downhole valve is tubing conveyed, but a side pocket mandrel for receiving a slickline insertable and retrievable gas-lift valve may also be used. With the side-pocket mandrel, either a controllable gas-lift valve in accordance with the present invention can be inserted, or a conventional bellows-type valve can be used. The tubing string is made up to the surface, where a ferromagnetic choke or other electrical isolation device such as an electrically insulating joint is again placed around the tubing string below the tubing hanger. Communication and power leads are then connected through the wellhead feed through to the tubing string below the upper ferromagnetic choke or other isolation device.

In an alternative form of the controllable gas lift well, a pod having only a sensor and communication device is inserted without the necessity of including a controllable gas-lift valve in every pod. That is, an electronics module having pressure, temperature or acoustic sensors or other sensors, a power supply, and a modem may be tubing conveyed or inserted into a side pocket mandrel for communication to the surface computer or with other downhole modules and controllable gas lift valves using the tubing and casing as conductors. Alternatively, such electronics modules may be mounted directly on the tubing (tubing conveyed) and not be configured to be wireline replaceable. If directly mounted to the tubing an electronic module or a controllable gas-lift valve may only be replaced by pulling the entire tubing string. In an alternative form, the controllable valve can have its separate control, power and wireless communication electronics mounted in the side pocket mandrel of the tubing and not in the wireline replaceable valve. In the preferred form, the electronics are integral and replaceable along with the gas-lift valve. In another form, the high permeability magnetic chokes may be replaced by electrically insulated tubing sections. Further, an insulated tubing hanger in the wellhead may replace the upper choke or such upper insulating tubing sections.

BRIEF DESCRIPTION OF THE DRAWINGS

FIGS. 5A–5C are cross-sectional front views of a controllable valve in a cage configuration according to one embodiment of the present invention.

FIG. 7 is an enlarged schematic front view of the tubing string and casing of FIG. 2, the tubing string having a controllable gas-lift valve permanently connected to the tubing string.

FIG. 8 is a cross sectional side views of the controllable gas-lift valve of FIG. 7 taken at VIII—VIII.

DETAILED DESCRIPTION OF THE INVENTION

Figure 1:
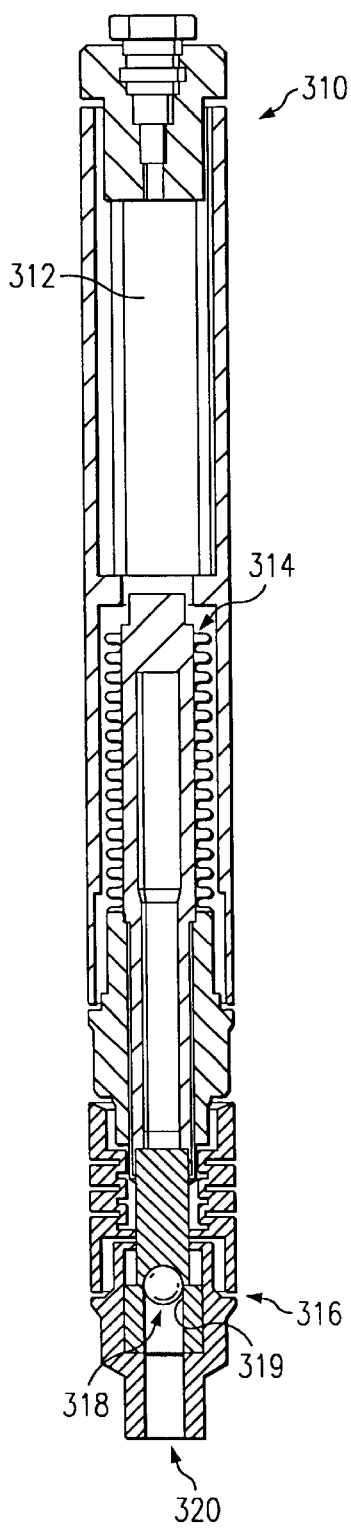
FIG. 1 is a cross-sectional front view of a prior art, bellows-type gas-lift valve.

As used in the present application, a "valve" is any device that functions to regulate the flow of a fluid. Examples of valves include, but are not limited to, bellows-type gas-lift valves and controllable gas-lift valves, each of which may be used to regulate the flow of lift gas into a tubing string of a well. The internal workings of valves can vary greatly, and in the present application, it is not intended to limit the valves described to any particular configuration, so long as the valve functions to regulate flow. Some of the various types of flow regulating mechanisms include, but are not limited to, ball valve configurations, needle valve configurations, gate valve configurations, and cage valve configurations. The methods of installation for valves discussed in the present application can vary widely. Valves can be mounted downhole in a well in many different ways, some of which include tubing conveyed mounting configurations, side-pocket mandrel configurations, or permanent mounting configurations such as mounting the valve in an enlarged tubing pod.

The term "modem" is used generically herein to refer to any communications device for transmitting and/or receiving electrical communication signals via an electrical conductor (e.g., metal). Hence, the term is not limited to the acronym for a modulator (device that converts a voice or data signal into a form that can be transmitted)/demodulator (a device that recovers an original signal after it has modulated a high frequency carrier). Also, the term "modem" as used herein is not limited to conventional computer modems that convert digital signals to analog signals and vice versa (e.g., to send digital data signals over the analog Public Switched Telephone Network). For example, if a sensor outputs measurements in an analog format, then such measurements may only need to modulate a carrier to be transmitted-hence no analog-to-digital conversion is needed. As another example, a relay/slave modem or communication device may only need to identify, filter, amplify, and/or retransmit a signal received.

The term "sensor" as used in the present application refers to any device that detects, determines, monitors, records, or otherwise senses the absolute value of or a change in a physical quantity. Sensors as described in the present application can be used to measure temperature, pressure (both absolute and differential), flow rate, seismic data, acoustic data, pH level, salinity levels, valve positions, or almost any other physical data.

The term "electronics module" in the present application refers to a control device. Electronics modules can exist in many configurations and can be mounted downhole in many different ways. In one mounting configuration, the electronics module is actually located within a valve and provides control for the operation of a motor within the valve. Electronics modules can also be mounted external to any particular valve. Some electronics modules will be mounted within side pocket mandrels or enlarged tubing pockets, while others may be permanently attached to the tubing string. Electronics modules often are electrically connected to sensors and assist in relaying sensor information to the surface of the well. It is conceivable that the sensors associated with a particular electronics module may even be packaged within the electronics module. Finally, the electronics module is often closely associated with, and may actually contain, a modem for receiving, sending, and relaying communications from and to the surface of the well. Signals that are received from the surface by the electronics module are often used to effect changes within downhole controllable devices, such as valves. Signals sent or relayed to the surface by the electronics module generally contain information about downhole physical conditions supplied by the sensors.

The terms "first end" and "second end" as used herein are defined generally to call out a side or portion of a piping structure, which may or may not encompass the most proximate locations, as well as intermediate locations along a called out side or portion of the piping structure. Similarly, in accordance with conventional terminology of oilfield practice, the descriptors "upper", "lower", "uphole" and "downhole" refer to distance along hole depth from the surface, which in deviated wells may or may not accord with absolute vertical placement measured with reference to the ground surface.

Figure 2:
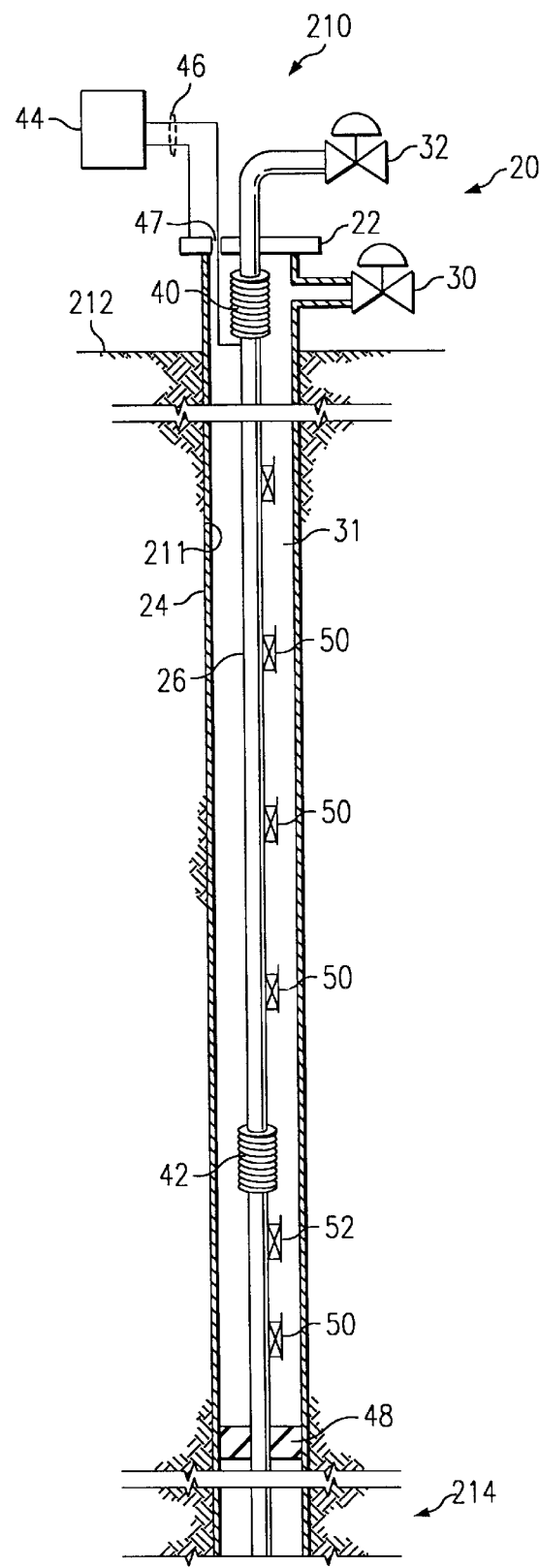
FIG. 2 is a schematic front view of a controllable gas-lift well according to one embodiment of the present invention, the gas-lift well having a tubing string and a casing positioned within a borehole.

Referring to FIG. 2 in the drawings, a petroleum well according to the present invention is illustrated. The petroleum well is a gas-lift well 210 having a borehole 211 extending from a surface 212 into a production zone 214 that is located downhole. A production platform is located at surface 212 and includes a hanger 22 for supporting a casing 24 and a tubing string 26. Casing 24 is of the type conventionally employed in the oil and gas industry. The casing 24 is typically installed in sections and is cemented in the borehole during well completion. Tubing string 26, also referred to as production tubing, is generally a conventional string comprising a plurality of elongated tubular pipe sections joined by threaded couplings at each end of the pipe sections, but may alternatively be continuously inserted as coiled tubing for example. The production platform includes a gas input throttle 30 to control the input of compressed gas into an annular space 31 between casing 24 and tubing string 26. Conversely, output valve 32 permits the expulsion of oil and gas bubbles from the interior of tubing string 26 during oil production.

An upper ferromagnetic choke 40 or insulating pipe joint, and a lower ferromagnetic choke 42 are installed on tubing string 26 to act as a series impedance to electric current flow. The size and material of ferromagnetic chokes 40, 42 can be altered to vary the series impedance value. The section of tubing string 26 between upper choke 40 and lower choke 42 may be viewed as a power and communications path (see also FIG. 9). Both upper and lower chokes 40, 42 are manufactured of high permeability magnetic material and are mounted concentric and external to tubing string 26. Chokes 40, 42 are typically insulated with shrink wrap plastic and encased with fiber-reinforced epoxy to withstand rough handling.

A computer and power source 44 having power and communication feeds 46 is disposed outside of borehole 211 at surface 212. Communication feeds 46 pass through a pressure feed 47 located in hanger 22 and are electrically coupled to tubing string 26 below upper choke 40. Power and communications signals are supplied to tubing string 26 from computer and power source 44.

A packer 48 is placed within casing 24 downhole below lower choke 42. Packer 48 is located above production zone 214 and serves to isolate production zone 214 and to electrically connect metal tubing string 26 to metal casing 24. Similarly, above surface 212, the metal hanger 22 (along with the surface valves, platform, and other production equipment) electrically connects metal tubing string 26 to metal casing 24. Typically, the electrical connections between tubing string 26 and casing 24 would not allow electrical signals to be transmitted or received up and down borehole 211 using tubing string 26 as one conductor and casing 24 as another conductor. However, the disposition of upper and lower ferromagnetic chokes 40, 42 around tubing string 26 alter the electrical characteristics of tubing 26, providing a system and method to provide power and communication signals up and down borehole 211 of gas-lift well 210.

A plurality of conventional bellows-type gas-lift valves 50 are operatively connected to tubing string 26 (see discussion of FIG. 1 in the Background of the Invention). The number of conventional valves 50 disposed along tubing string 26 depends upon the depth of the well and the well lift characteristics. A controllable gas-lift valve 52 in accordance with the present invention is attached to tubing string 26 as the penultimate gas-lift valve. In this embodiment, only one controllable gas-lift valve 52 is used.

Figure 3:
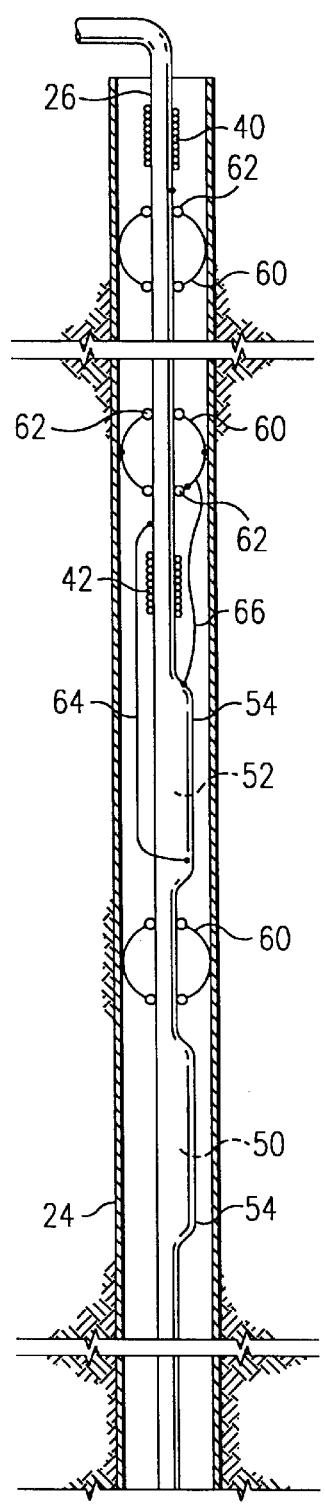
FIG. 3 is a schematic front view of the tubing string and casing of FIG. 2, the tubing string having side pocket mandrels positioned thereon.

Referring now to FIG. 3 in the drawings, the downhole configuration of bellows-type valve 50 and controllable valve 52, as well as the electrical connections with casing 24 and tubing string 26, is depicted. The pipe sections of tubing string 26 are conventional and where it is desired to incorporate a gas-lift valve in a particular pipe section, a side pocket mandrel 54, commonly available in the industry, is employed. Each side pocket mandrel 54 is a non-concentric enlargement of tubing string 26 that permits wireline retrieval and insertion of either bellows-type valves 50 or controllable valves 52 downhole.

Figure 4A:
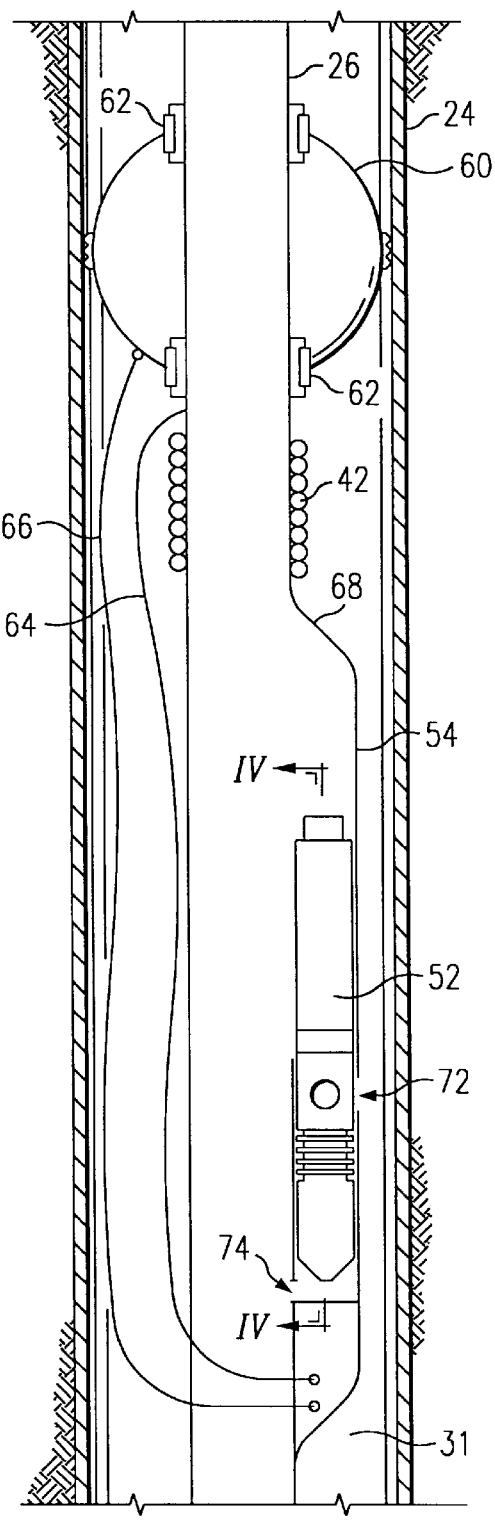
FIG. 4A is an enlarged schematic front view of the side pocket mandrel of FIG. 3 and a controllable gas-lift valve, the valve having an internal electronics module and being wireline retrievable from the side pocket mandrel.
Figure 4B:
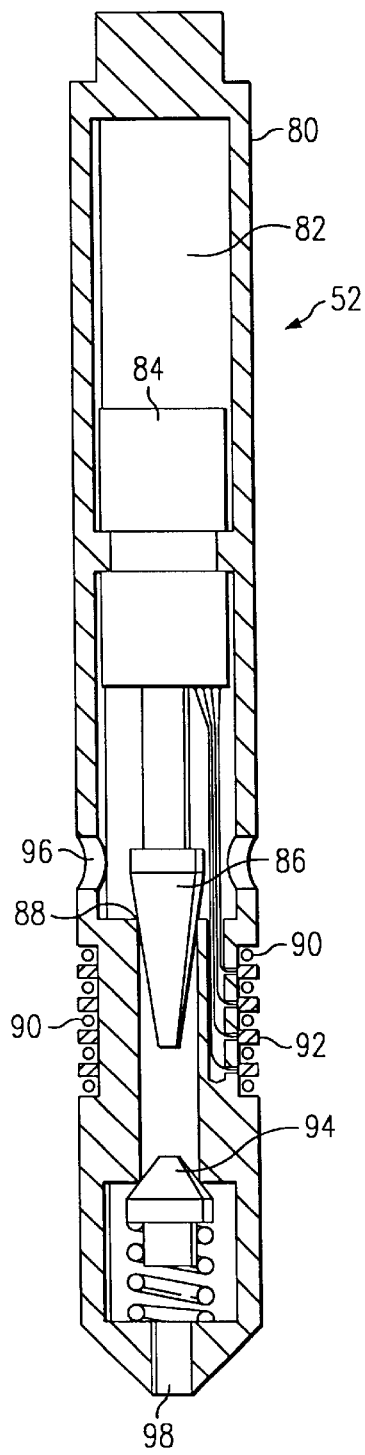
FIG. 4B is a cross-sectional side view of the controllable gas-lift valve of FIG. 4A taken at IV—IV.

Referring still to FIG. 3, but also to FIGS. 4A and 4B, a plurality of bow spring centralizers 60 may be installed at various locations along the length of tubing string 26 to center tubing string 26 relative to casing 24. When located between upper and lower chokes 40, 42, each bow spring centralizer 60 includes insulators 62 to electrically isolate casing 24 from tubing string 26. A power and signal jumper wire 64 electrically connects controllable valve 52 to tubing string 26 at a point between upper choke 40 and lower choke 42. Although controllable valve 52 is shown below lower choke 42, the valve 52 could be disposed above lower choke 42 such that controllable valve 52 is electrically coupled to tubing string 26 without using a power jumper. A ground wire 66 provides a return path from controllable valve 52 to casing 24 via electrically conductive centralizer 60. While jumper wire 64 and ground wire 66 are illustrated schematically in FIGS. 3 and 4A, it will be appreciated that in commercial use jumper wire 64 and ground wire 66 may be insulated and predominantly integral to a housing of side pocket mandrel 54.

It should be noted that the power supplied downhole through tubing string 26 is effective only when annulus 31 does not contain an electrically conductive liquid between upper choke 40 and lower choke 42. If an electrically conductive liquid is present in the annulus 31 between the chokes 40, 42, the liquid will cause a short circuit of the current in tubing string 26 to casing 24.

Use of controllable valves 52 may be preferable to use of conventional bellows valves for several reasons. For example, conventional bellows valves 50 (see FIG. 1) often leak when they should be closed during production, resulting in inefficient well operation. Additionally, conventional bellows valves 50 are usually designed to use sequentially decremented operating presssures resulting in the inability to make use of full available lift pressure, therefore resulting in further inefficiency.

Referring more specifically to FIGS. 4A and 4B, a more detailed illustration of controllable gas-lift valve 52 and side pocket mandrel 54 is provided. Side pocket mandrel 54 includes a housing 68 having a gas inlet port 72 and a gas outlet port 74. When controllable valve 52 is in an open position, gas inlet port 72 and gas outlet port 74 provide fluid communication between annular space 31 and an interior of tubing string 26. In a closed position, controllable valve 52 prevents fluid communication between annular space 31 and the interior of tubing string 26. In a plurality of intermediate positions located between the open and closed positions, controllable valve 52 meters the amount of gas flowing from annular space 31 into tubing string 26 through gas inlet port 72 and gas outlet port 74.

Controllable gas-lift valve 52 includes a generally cylindrical, hollow housing 80 configured for reception in side pocket mandrel 54, and is furnished with a latching method to leave and retrieve the valve using a tubing accessible method such as slickline. An electronics module 82 is disposed within housing 80 and is electrically connected to a stepper motor 34 for controlling the operation thereof. Operation of stepper motor 84 adjusts a needle valve head 86, thereby controlling the position of needle valve head 86 in relation to a valve seat 88. Movement of needle valve head 86 by stepper motor 84 directly affects the amount of fluid communication that occurs between annular space 31 and the interior of tubing string 26. When needle valve head 86 fully engages valve seat 88 as shown in FIG. 4B, the controllable valve 52 is in the closed position.

Seals 90 are made of an elastomeric material and allow controllable valve 52 to sealingly engage side pocket mandrel 54. Slip rings 92 surround a lower portion of housing 80 and are electrically connected to electronics module 82. Slip rings 92 provide an electrical connection for power and communication between tubing string 26 and electronics module 82.

Controllable valve 52 includes a check valve head 94 disposed within housing 80 below needle valve head 86. An inlet 96 and an outlet 98 cooperate with inlet port 72 and outlet port 74 when valve 52 is in the open position to provide fluid communication between annulus 31 and the interior of tubing string 26. Check valve 94 insures that fluid flow only occurs when the pressure of fluid in annulus 31 is greater than the pressure of fluid in the interior of tubing string 26.

Referring to FIGS. 5A, 5B, and 5C in the drawings, another embodiment of a controllable valve 220 according to the present invention is illustrated. Controllable valve 220 includes a housing 222 and is slidably received in a side pocket mandrel 224 (similar to side pocket mandrel 54 of FIG. 4A). Side pocket mandrel 224 includes a housing 226 having a gas inlet port 228 and a gas outlet port 230. When controllable valve 220 is in an open position, gas inlet port 228 and gas outlet port 230 provide fluid communication between annular space 31 and an interior of tubing string 26. In a closed position, controllable valve 220 prevents fluid communication between annular space 31 and the interior of tubing string 26. In a plurality of intermediate positions located between the open and closed positions, controllable valve 220 meters the amount of gas flowing from annular space 31 into tubing string 26 through gas inlet port 228 and gas outlet port 230.

A motor 234 is disposed within housing 222 of controllable valve 220 for rotating shaft 236. Pinion 236 engages a worm gear 238, which in turn raises and lowers a cage 240. When valve 220 is in the closed position, cage 240 engages a seat 242 to prevent flow into an orifice 244, thereby preventing flow through valve 220. As shown in more detail in FIG. 5B, a shoulder 246 on seat 242 is configured to sealingly engage a mating collar on cage 240 when the valve is closed. This "cage" valve configuration with symmetrically spaced and opposing flow ports is believed to be a preferable design since the impinging flow minimizes erosion when compared to the alternative embodiment of a needle valve configuration (see FIG. 4B). More specifically, fluid flow from inlet port 228, past the cage and seat juncture (240, 242) permits precise fluid regulation without undue fluid wear on the mechanical interfaces.

Controllable valve 220 includes a check valve head 250 disposed within housing 222 below cage 240. An inlet 252 and an outlet 254 cooperate with gas inlet port 228 and gas outlet port 230 when valve 220 is in the open position to provide fluid communication between annulus 31 and the interior of tubing string 26. Check valve head 250 insures that fluid flow only occurs when the pressure of fluid in annulus 31 is greater than the pressure of fluid in the interior of tubing string 26.

An electronics module 256 is disposed within the housing of controllable valve 220. Electronics module is operatively connected to valve 220 for communication between the surface of the well and the valve. In addition to sending signals to the surface to communicate downhole physical conditions, the electronics module can receive instructions from the surface and adjust the operational characteristics of the valve 220.

Figure 6:
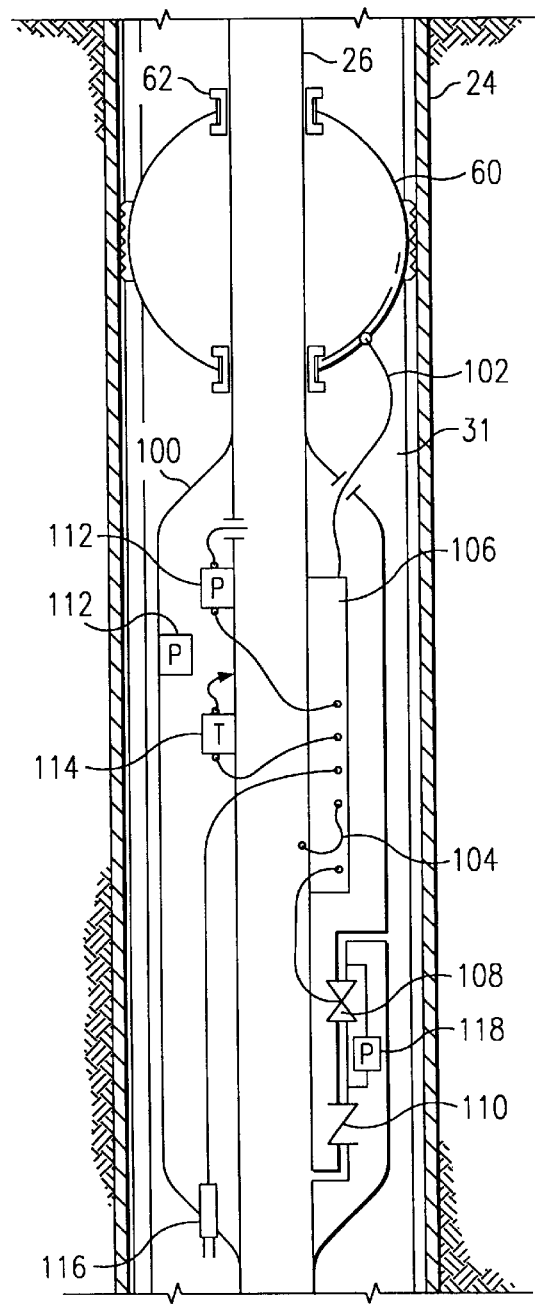
FIG. 6 is an enlarged schematic front view of the tubing string and casing of FIG. 2, the tubing string having an electronics module, sensors, and a controllable gas-lift valve operatively connected to an exterior of the tubing string.

While FIGS. 4A, 4B, and FIGS. 5A–5C illustrate the embodiments of the controllable valve in accordance with the present invention, other embodiments are possible without departing from the spirit and scope of the present invention. In particular, patent publication WO02/059457, entitled "Downhole Motorized Control Valve" describes yet another embodiment and is incorporated herein by reference. Referring to FIG. 6 in the drawings, an alternative installation configuration for a controllable valve assembly is shown and should be contrasted with the slide pocket mandrel configuration of FIG. 4A. In FIG. 6, tubing 26 includes an annularly enlarged pocket, or pod 100 formed on the exterior of tubing string 26. Enlarged pocket 100 includes a housing that surrounds and protects the controllable gas-lift valve assembly and an electronics module 106. In this mounting configuration, gas-lift valve assembly is rigidly mounted to tubing string 26 and is not insertable and retrievable by wireline. A ground wire 102 (similar to ground wire 66 of FIG. 4A) is fed through enlarged pocket 100 to connect electronics module 106 to bow spring centralizer 60, which is grounded to casing 24. Electronics module 106 is rigidly connected to tubing string 26 and receives communications and power via a power and signal jumper 104. The electronics module 106 in this configuration is not insertable or retrievable by wireline.

Enlarge pocket 100 includes a housing that surrounds and protects controllable the gas-lift valve assembly and an electronics module 106. In this mounting configuration, gas-lift valve assembly is rigidly mounted to tubing string 26 and is not insertable and retrievable by wireline. A ground wire 102 (similar to ground wire 66 of FIG. 4A) is fed through enlarged pocket 100 to connect electronics module 106 to bow spring centralizer 60, which is grounded to causing 24. Electronics module 106 is rigidly connected to tubing string 26 and receives communications and power via a power and signal jumper 104. The electronics module 106 in this configuration is not insertable or retrievable by wireline.

Controllable valve assembly includes a motorized cage valve 108 and a check valve 110 that are schematically illustrated in FIG. 6. Cage valve 108 and check valve 110 operate in a similar fashion to cage 240 and check valve head 250 of FIG. 5A. The valves 108, 110 cooperate to control fluid communication between annular space 31 and the interior of tubing string 26.

A plurality of sensors are used in conjunction with electronics module 106 to control the operation of controllable valve and gas-lift well 210. Pressure sensors, such as those produced by Three Measurement Specialties, Inc., can be used to measure internal tubing pressure, internal pod housing pressures, and differential pressures across gas-lift valves. In commercial operation, the internal pod pressure is considered unnecessary. A pressure sensor 112 is rigidly mounted to tubing string 26 to sense the internal tubing pressure of fluid within tubing string 26. A pressure sensor 118 is mounted within pocket 100 to determine the differential pressure across cage valve 108. Both pressure sensor 112 and pressure sensor 118 are independently electrically coupled to electronics module 106 for receiving power and for relaying communications. Pressure sensors 112, 118 are potted to withstand the severe vibration associated with gas-lift tubing strings.

Temperature sensors, such as those manufactured by Four Analog Devices, Inc. (e.g. LM-34), are used to measure the temperature of fluid within the tubing, housing pod, power transformer, or power supply. A temperature sensor 114 is mounted to tubing string 26 to sense the internal temperature of fluid within tubing string 26. Temperature sensor 114 is electrically coupled to electronics module 106 for receiving power and for relaying communications. The temperature transducers used downhole are rated for −50 to 300° F. and are conditioned by input circuitry to +5 to +255° F. The raw voltage developed at a power supply in electronics module 106 is divided in a resistive divider element so that 25.5 volts will produce an input to the analog/digital converter of 5 volts.

A salinity sensor 116 is also electrically connected to electronics module 106. Salinity sensor 116 is rigidly and sealingly connected to the housing of enlarged pocket 100 to sense the salinity of the fluid in annulus 31.

It should be understood that the alternate embodiments illustrated in FIGS. 4A, 5C and 6 could include or exclude any number of the sensors 112, 114, 116 or 118. Sensors other than those displayed could also be employed in either of the embodiments. These could include gauge pressure sensors, absolute pressure sensors, differential pressure sensors, flow rate sensors, tubing acoustic wave sensors, valve position sensors, or a variety of other analog signal sensors. Similarly, it should be noted that while electronics module 82 shown in FIG. 4B is packaged within valve 52, an electronics module similar to electronics module 106 could be packaged with various sensors and deployed independently of controllable valve 52.

Referring to FIGS. 7 and 8 in the drawings, a controllable gas-lift valve 132 having a valve housing 133 is mounted on a tubing conveyed mandrel 134. Controllable valve 132 is mounted similar to most of the bellows-type gas-lift valves that are in use today. These valves are not wireline replaceable, and must be replaced by pulling tubing string 26. An electronics module 138 is mounted within housing 133 above a motor 142 that drives a needle valve head 144. A check valve 146 is disposed within housing 133 below needle valve head 144. Stepper motor 142, needle valve head 144, and check valve 146 are similar in operation and configuration to those used in controllable valve 52 depicted in FIG. 4B. It should be understood, however, that valve 132 could include a cage configuration (as opposed to the needle valve configuration) similar to valve 220 of FIG. 5A. In similar fashion to FIG. 4B, an inlet opening 148 and an outlet opening 150 are provided to provide a fluid communication path between annulus 31 and the interior of tubing string 26.

Power and communications are supplied to electronics module 138 by a power and signal jumper 140 connected between electronics module 138 and housing 133. Power is supplied to housing 133 either directly from tubing string 26 or via a wire (not shown) connected between housing 133 and tubing string 26. A ground wire 136 couples electronics module 138 centralizer 60 for grounding purposes.

Although not specifically shown in the drawings, electronics module 138 could have any number of sensors electrically coupled to the module 138 for sensing downhole conditions. These could include pressure sensors, temperature sensors, salinity sensors, flow rate sensors, tubing acoustic wave sensors, valve position sensors, or a variety of other analog signal sensors. These sensors would likely be connected in a manner similar to that used for sensors 112, 114, 116, and 118 of FIG. 6.

Figure 9:
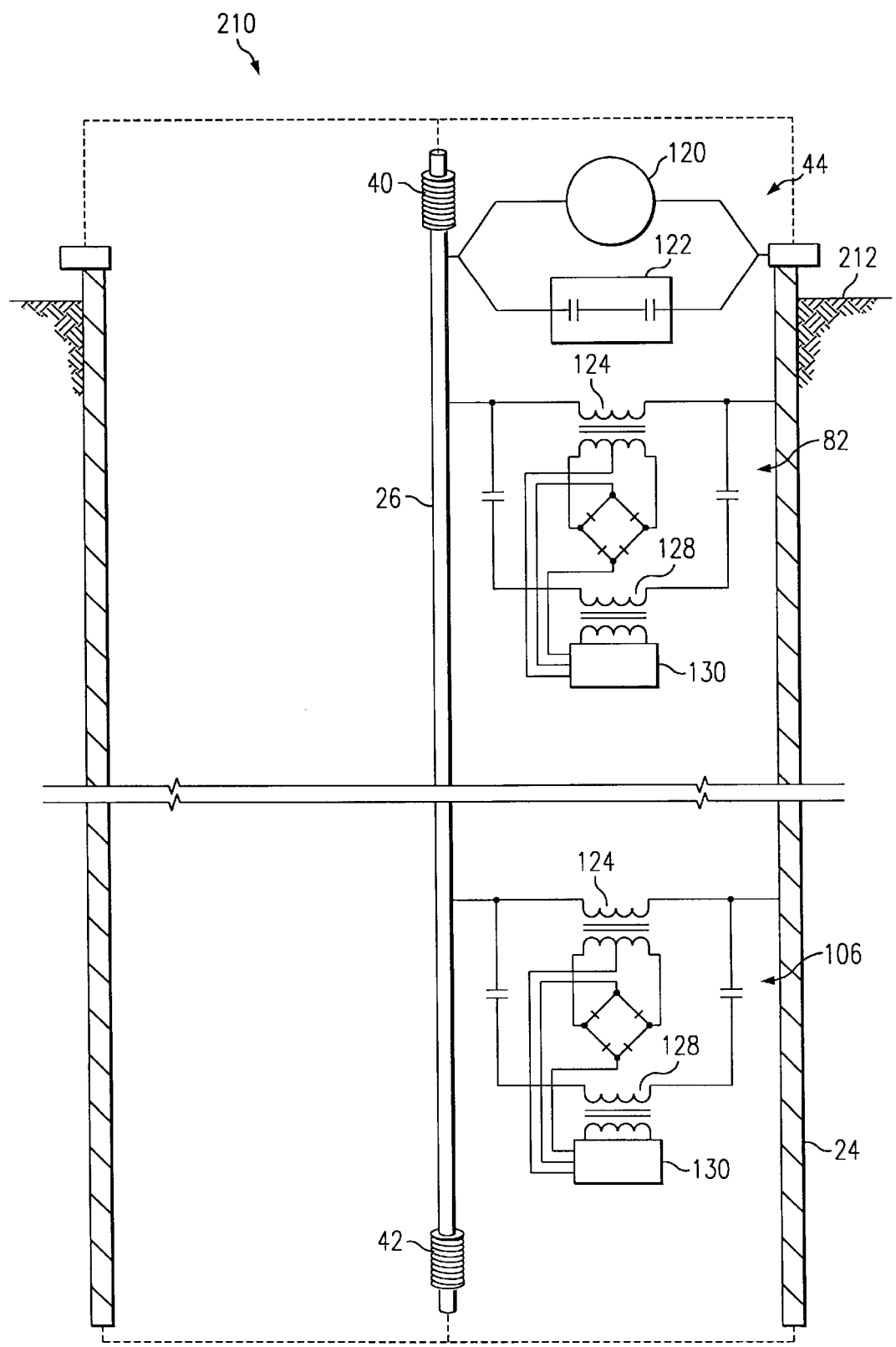
FIG. 9 is a schematic of an equivalent circuit diagram for the controllable gas-lift well of FIG. 2, the gas-lift well having an AC power source, the electronics module of FIG. 4, and the electronics module of FIG. 6.

Referring now to FIG. 9 in the drawings, an equivalent circuit diagram for gas-lift well 210 is illustrated and should be compared to FIG. 2. Computer and power source 44 includes an AC power source 120 and a master modem 122 electrically connected between casing 24 and tubing string 26. As discussed previously, electronics module 82 is mounted internally within a valve housing that is wireline insertable and retrievable downhole. Electronics module 106 is independently and permanently mounted in an enlarged pocket on tubing string 26. Although not shown, the equivalent circuit diagram could also include depictions of electronics module 256 of FIG. 5A or electronic module 138 of FIG. 8.

For purposes of the equivalent circuit diagram of FIG. 9, it is important to note that while electronics modules 82, 106 appear identical, both modules 82, 106 being electrically connected between casing 24 and tubing string 26, electronics modules 82, 106 may contain or omit different components and combinations such as sensors 112, 114, 116, 118. Additionally, the electronics modules may or may not be an integral part of the controllable valve. Each electronics module includes a power transformer 124 and a data transformer 128. Data transformer 128 is electrically coupled to a slave modem 130.

Figure 10:
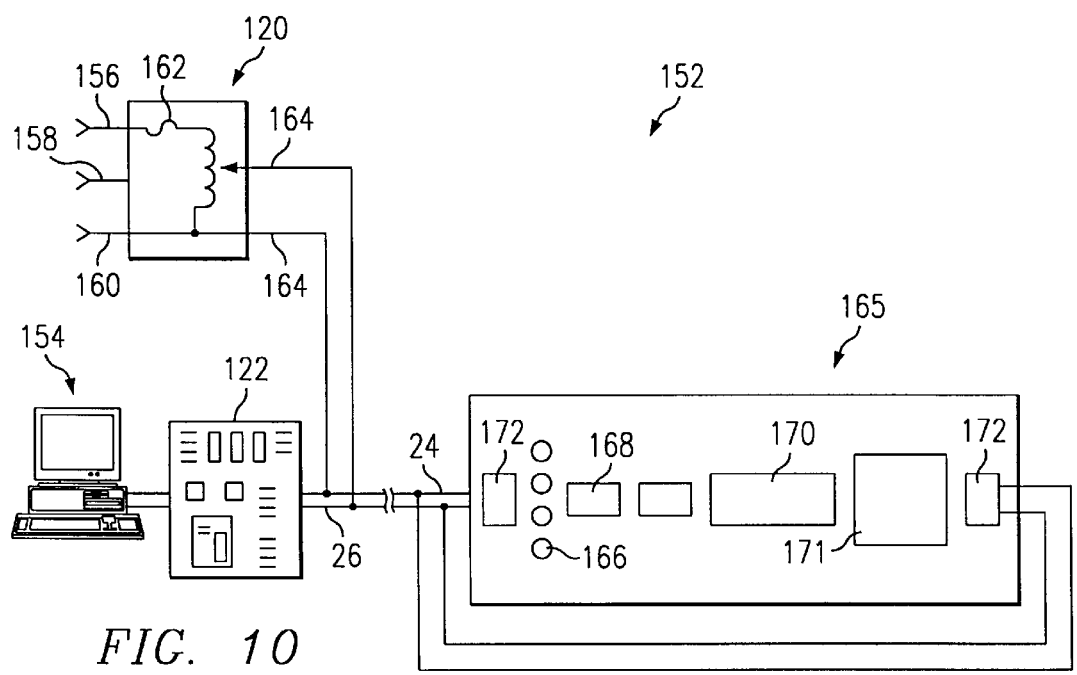
FIG. 10 is a schematic diagram depicting a surface computer electrically coupled to an electronics module of the gas-lift well of FIG. 2.

Referring to FIG. 10 in the drawings, a block diagram of a communications system 152 according to the present invention is illustrated. FIG. 10 should be compared and contrasted with FIGS. 2 and 9. Communications system 152 includes master modem 122, AC power source 120, and a computer 154. Computer 154 is coupled to master modem 122, preferably via an RS 232 bus, and runs a multitasking operating system such as Windows NT and a variety of user applications. AC power source 120 includes a 120 volt AC input 156, a ground 158, and a neutral 160 as illustrated. Power source 120 also includes a fuse 162, preferably 7.5 amp, and has a transformer output 164 at approximately 6 volts AC and 60 Hz. Power source 120 and master modem 122 are both connected to casing 24 and tubing 26.

Communications system 152 includes an electronics module 165 that is analogous to module 82 in FIG. 4B, module 256 in FIG. 5B, module 106 in FIG. 6, and module 138 in FIG. 8. Electronics module 165 includes a power supply 166 and an analog-to-digital conversion module 168. A programmable interface controller (PIC) 170 is electrically coupled to a slave modem 171 (analogous to slave modem 130 of FIG. 9). Couplings 172 are provided for coupling electronics module 165 to casing 24 and tubing 26.

Figure 11:
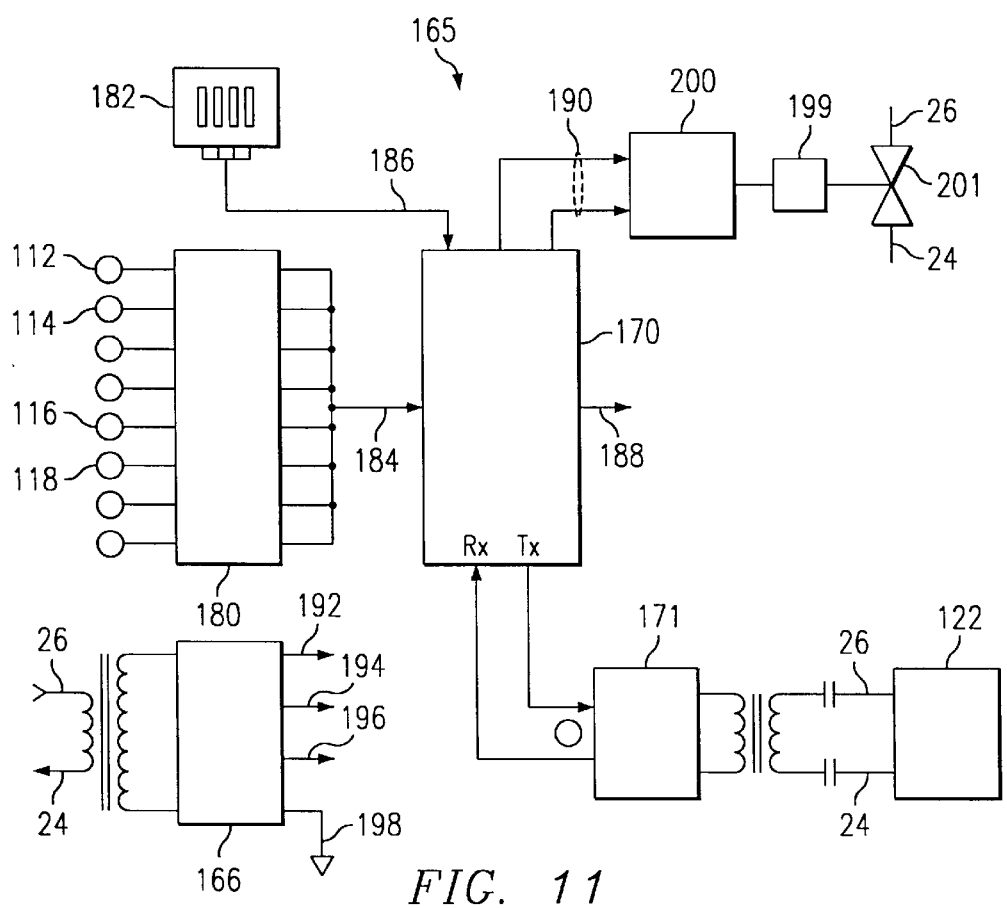
FIG. 11 is a system block diagram of the electronics module of FIG. 10.

Referring to FIG. 11 in the drawings, electronics module 165 is illustrated in more detail. Amplifiers and signal conditioners 180 are provided for receiving inputs from a variety of sensors such as tubing temperature, annulus temperature, tubing pressure, annulus pressure, lift gas flow rate, valve position, salinity, differential pressure, acoustic readings, and others. Some of these sensors are analogous to sensors 112, 114, 116, and 118 shown in FIG. 6. Preferably, any low noise operational amplifiers are configured with non-inverting single ended inputs (e.g. Linear Technology LT1369). All amplifiers 180 are programmed with gain elements designed to convert the operating range of an individual sensor input to a meaningful 8 bit output. For example, one psi of pressure input would produce one bit of digital output, 100 degrees of temperature will produce 100 bits of digital output, and 12.3 volts of raw DC voltage input will produce an output of 123 bits. Amplifiers 180 are capable of rail-to-rail operation.

Electronics module 165 is electrically connected to master modem 122 via casing 24 and tubing string 26. Address switches 182 are provided to address a particular device from master modem 122. As shown in FIG. 11, 4 bits of addresses are switch selectable to form the upper 4 bits of a full 8 bit address. The lower 4 bits are implied and are used to address the individual elements within each electronics module 165. Thus, using the configuration illustrated, sixteen modules are assigned to a single master modem 122 on a single communications line. As configured, up to four master modems 122 can be accommodated on a single communications line.

Electronics module 165 also includes PIC 170, which preferably has a basic clock speed of 20 MHz and is configured with 8 analog-to-digital inputs 184 and 4 address inputs 186. PIC 170 includes a TTL level serial communications UART 188, as well as a motor controller interface 190.

Electronics module 165 also contains a power supply 166. A nominal 6 volts AC line power is supplied to power supply 166 along tubing string 26. Power supply 166 converts this power to plus 5 volts DC at terminal 192, minus 5 volts DC at terminal 194, and plus 6 volts DC at terminal 196. A ground terminal 198 is also shown. The converted power is used by various elements within electronics module 165.

Although connections between power supply 166 and the components of electronics module 165 are not shown, the power supply 166 is electrically coupled to the following components to provide the specified power. PIC 170 uses plus 5 volts DC, while slave modem 171 uses plus 5 and minus 5 volts DC. A motor 199 (analogous to motor 84 of FIG. 4B, motor 234 of FIG. 5A, and motor 142 of FIG. 8) is supplied with plus 6 volts DC from terminal 196. Power supply 166 comprises a step-up transformer for converting the nominal 6 volts AC to 7.5 volts AC. The 7.5 volts AC is then rectified in a full Wave bridge to produce 9.7 volts of unregulated DC current. Three-terminal regulators provide the regulated outputs at terminals 192, 194, and 196 which are heavily filtered and protected by reverse EMF circuitry. Modem 171 is the major power consumer in electronics module 165, typically using 350+ milliamps at plus/minus 5 volts DC when transmitting.

Modem 171 is typically a wideband digital modem having an IC/SS power line carrier chip set such as models EG ICS 1001, ICS 1002 and ICS 1003 manufactured by National Semiconductor. Modem 171 is capable of 300–3200 baud data rates at carrier frequencies ranging from 14 kHz to 76 kHz. U.S. Pat. No. 5,488,593 describes the chip set in more detail and is incorporated herein by reference. Any modem with an adequate data rate may be substituted for this choice of specific components.

PIC 170 controls the operation of a suitable valve control motor 199 through, for example, stepper motor controller 200 such as model SA1042 manufactured by Motorola. Controller 200 needs only directional information and simple clock pulses from PIC 170 to drive stepper motor 199. An initial setting of controller 200 conditions all elements for initial operation in known states. Stepper motor 199, preferably a MicroMo gear head, positions a rotating stem control valve 201 (analogous to needle valve heads 86, 108, and 144 of FIGS. 4B, 6, and 8, respectively), which is the principal operative component of the controllable gas-lift valve. Alternatively, motor 199 could position a cage analogous to cage 240 of FIG. 5A. Motor 199 provides 0.4 inch-ounce of torque and rotates at up to 500 steps per second. A complete revolution of stepper motor 199 consists of 24 individual steps. The output of stepper motor 199 is directly coupled to a 989:1 gear head, and the output shaft from the gearhead may thus rotate at a maximum of 1.26 revolutions per minute, and can exert a maximum torque of 24.7 inch-pounds. This produces the necessary torque to open and close needle valve 201. The continuous rotational torque required to open and close needle valve 201 is 3 inch-pounds with 15 inch-pounds required to seat and unseat the valve 201.

PIC 170 communicates through modem 171 to the surface modem 122 via casing 24 and tubing string 26. PIC 170 uses a MODBUS 584/985 PLC communications protocol, with commands and data ASCII encoded for transmission.

As noted previously with reference to FIG. 2, the embodiments thus far described for providing power and communications for controllable gas lift valve 52 are restricted to the well condition where annular space between tubing 26 and casing 24 is cleared of conductive fluid. In some circumstances for example during the unloading or kickoff processes, it may desirable to allow all of the valves in a gas lift well to be powered and controlled from the surface.

Figure 12:
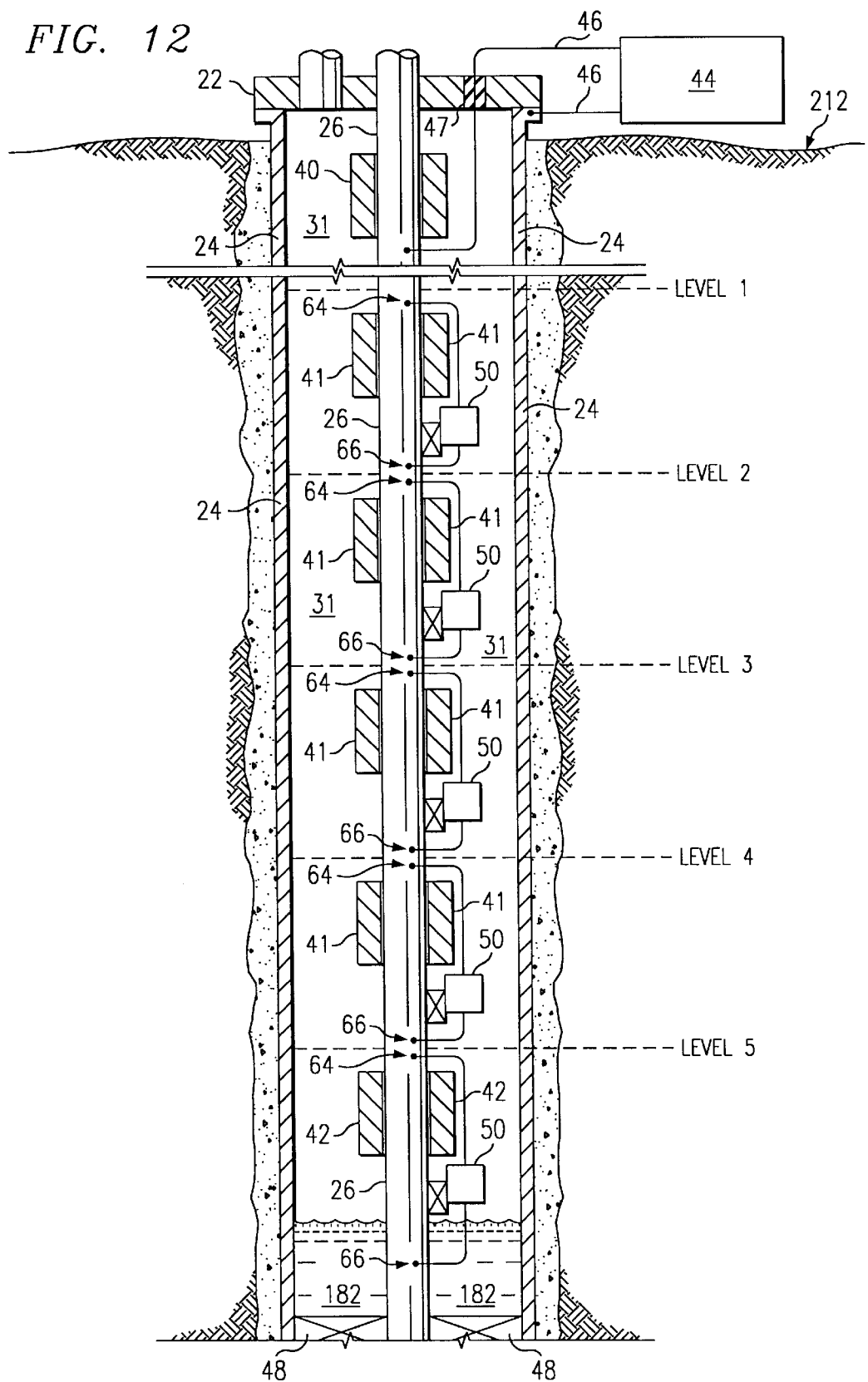
FIG. 12 illustrates a disposition of chokes and controllable gas-lift valves to provide control of the valves when the tubing-casing annulus is partially filled with conductive fluid.

FIG. 12 illustrates an embodiment in which power and communications may be established for valves when the annulus 31 is only partially cleared of conductive fluid. As in the previous embodiments, surface equipment 44 includes an AC power source and communications device coupled by conductors 46 to tubing 26 and casing 24. An upper choke 40 impedes AC which would otherwise be electrically short-circuited through hanger 22, and the AC is thus directed down tubing string 26 to downhole equipment. At each location where it is desired to place a downhole electronics module 50 there is a choke 41 which creates an impedance to AC and therefore generates a voltage on the tubing 34 between the tubing above and below the choke. This voltage is connected by wires 64 and 66 to each electronics module 50, and thus the voltage developed by the action of each choke 41 may be used to transfer power and communications signals to its corresponding electronics module 50. Connections 64, 66, and the action of chokes 41, also allow communications signals from each module 50 to be impressed on tubing 34 and received at surface equipment 44. When the level of conducting fluid 182 is at level 1 of FIG. 12, none of the chokes will function to power their modules, since AC between tubing and casing is electrically short-circuited by fluid 182 before it reaches any of the chokes. However, when the fluid level is at level 2, the upper choke 41 is effective since there is no longer an electrical short-circuit between tubing and casing above the upper choke 41, and a potential difference can be developed on the tubing section that passes through the upper choke. Thus power and communications become available for the electronics module above level 2. The same principle applies to the intermediate levels: as the surface of fluid 182 is driven downwards past levels 3, 4 and 5, the corresponding electronics modules at these levels become operable. The lowermost module is energized by choke 42, and becomes operable when the fluid 182 is as illustrated in FIG. 12, below the lowest choke 42.

Operation

Figure 13:
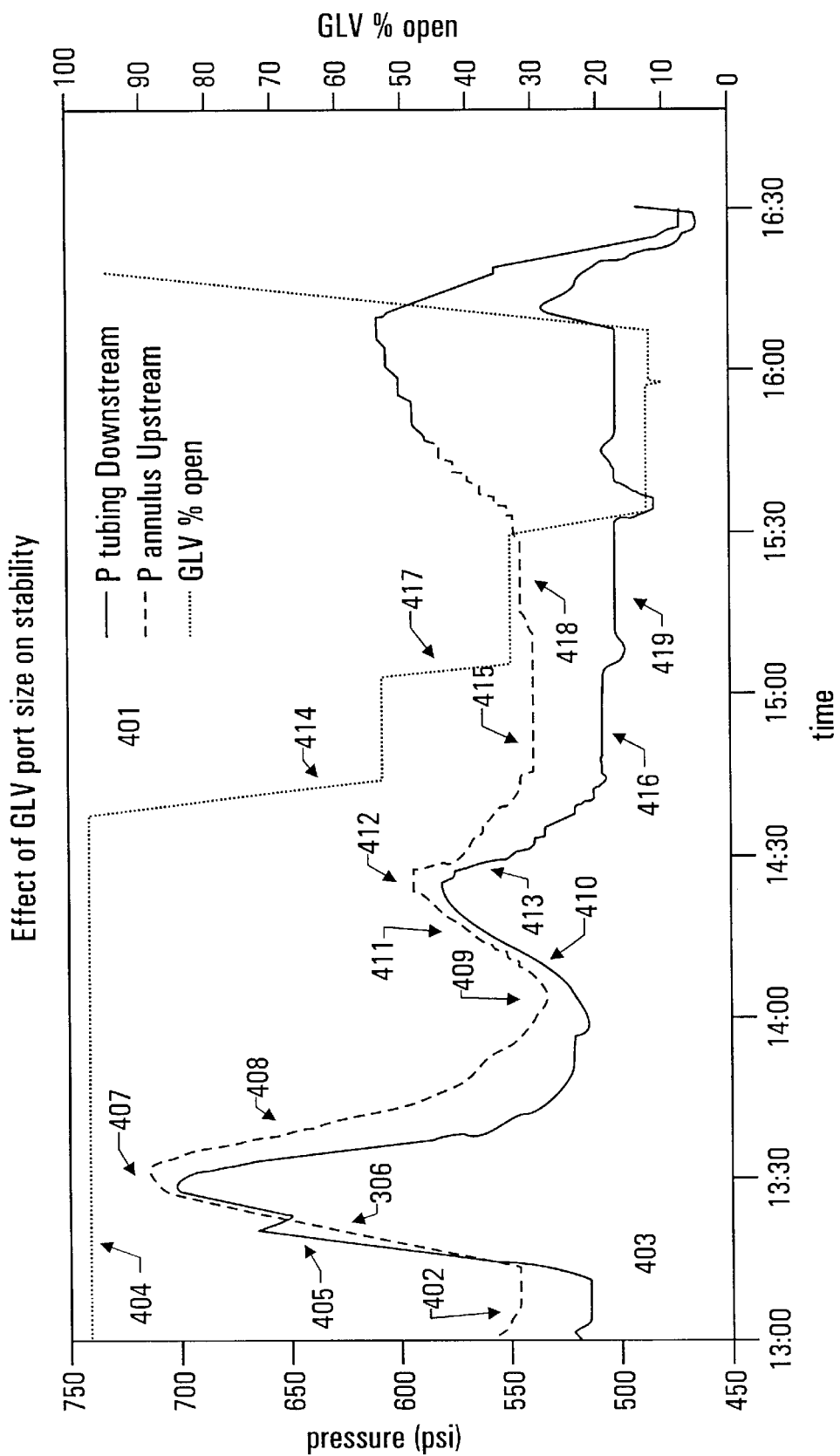
FIG. 13 depicts a time-series chart showing the relationships between degree of opening of a gas-lift valve, annulus pressure, tubing pressure, and lifted fluid flow regimes.

FIG. 13 demonstrates the benefit of the availability of data and a method to respond to observations with a downhole control action. The chart of FIG. 13 presents a time series trend of three values. The first value is valve position 401, expressed as a percent of full open (full open=100%) which is quantified by referencing the Y-axis on the right side of the plot. The second value is annulus pressure 402, which is quantified by referencing the Y-axis scale on the left side of the plot. The annulus pressure is the pressure of the lift gas being supplied to the well and is upstream of the downhole controllable gas lift valve. The third value is the tubing pressure 403, which is quantified by referencing the Y-axis on the left side of the plot. The tubing pressure is the pressure in the production tubing downstream of the controllable gas lift valve.

In a typical oil well, reducing the pressure in the tubing by injecting bubbles of gas into the liquid column above the point of lift gas injection into the tubing results in a decreased back-pressure on the reservoir. The decrease in back-pressure results in increased differential pressure from the reservoir to the tubing and therefore flow from the reservoir to the tubing and to the surface. An increase in downhole tubing pressure creates an increased back pressure on the reservoir, which decreases flow, even to the point of stopping inflow from the reservoir completely. It is important that the tubing pressure remain low and stable in order to achieve stable production rates from the reservoir to the surface and to the production facilities. Unstable flow causes upset conditions in production facilities due to the large changes in flow rate over short periods of time. Large surges in liquid and gas production can upset production processes creating inefficient and possibly hazardous conditions.

As previously discussed, conventional gas lift valves are configured before installation using information available at the time of configuration. As the well conditions change over time, the original configuration of the gas lift valve may no longer be appropriate for the new conditions. The effect of this miss-match is shown in FIG. 13.

A gas lift valve port that is inappropriately large has been created by fully opening the downhole controllable gas lift valve as shown at 404. The reservoir fluids are allowed to fill the tubing, causing the pressure to increase at 405. Gas is introduced into the annulus, causing the annulus pressure to increase at 406. The gas does not flow from the annulus to the tubing as the annulus pressure is less than the tubing pressure. The downstream pressure must be less than the upstream pressure in order to initiate flow. Gas does not flow from the tubing back into the annulus due to the presence of a reverse-flow check valve which prevents such backflow.

When the annulus pressure 406 increases sufficiently to exceed the tubing pressure 405, gas flow is initiated into the tubing, the tubing pressure is reduced as the gas reduces the density of the tubing fluids via injection of bubbles into the liquid column at 407. As the tubing pressure drops, the annulus pressure also begins to decline at 408 as the gas is flowing from the annulus to the tubing at a rate higher than gas is being introduced into the annulus from the surface. The gas flow rate from the annulus to the tubing is a function of the downhole controllable gas lift valve opening position which is 100%, and the differential pressure between the annulus and the tubing. If the gas flow out of the annulus into the tubing exceeds the injection rate into the annulus at the surface, the annulus pressure falls. If the gas flow out of the annulus into the tubing is less than the injection rate into the annulus at the surface, the annulus pressure increases.

If annulus outflow exceeds inflow for an extended period of time, the pressure difference between the annulus and the tubing may decline to level where insufficient gas enters the tubing to keep the fluids aerated to the degree required to maintain a low tubing pressure as shown at 409. At that point, the tubing pressure begins to increase, 410, as the density increases. The annulus pressure increases, 411, also as the differential pressure between the annulus and tubing is so small that the gas flow rate into the tubing from the annulus is less than the rate of gas input into the annulus at the surface.

At some point, 412, the pressure differential between the annulus and the tubing increases sufficiently for the volume of gas entering the tubing to reduce the density and cause the pressure to decrease, 413. This begins another "heading" cycle that originally began at 407. Left unchecked, such cycles repeat continuously. The surges of liquids and gas delivered to the producing facilities and the surges of lift gas demanded from the supply system generally influence not only the well suffering from the cause, but also affect other wells in the system. It is therefore desirable to correct this problem as quickly as possible. Conventional gas lift installations require that the well be closed in (stopping production) and remedial service work be performed on the well to remove the improperly sized or eroded valve and replace with one that has been configured for the new producing conditions. This results in significant cost and deferment of oil production.

In the case of a downhole controllable gas lift valve, the flow capacity of the valve can be adjusted without any service work or loss of production by closing the valve to some degree, such as closing from 97% open to 52% open as shown at 414. The result of this action is to present excessive flow out of the annulus into the tubing, which causes the upstream (annulus) pressure to stabilize, 415, and also the downstream (tubing pressure) to stabilize, 416.

With downhole data available in real-time, a further adjustment, 417, of the downhole controllable gas lift valve maintains stable annulus pressure, 418, and tubing pressure, 419, but causes the tubing pressure to decline slightly from the previous pressure. This pressure decline slightly reduces the back pressure on the reservoir, slightly increasing production rate as a result. A conventional gas lift system cannot provide the data or the ability to make such small adjustments, which enable continuous optimization of the producing system via feedback and response loops.

To illustrate the benefit of independent control for every lift gas valve in a well, FIG. 12 may be used to describe a process for unloading a gas lift well based on the methods of the present invention.

Typically the unloading process starts with the annulus 31 filled with completion fluid 182, to level 1 of the well as illustrated in FIG. 12. The completion fluid 182 is normally a brine which is electrically conductive, and thus creates an electrical connection between tubing 34 and casing 24. Each downhole module 50 controls a motorized gas lift valve which may be opened to permit fluid, either liquid or gas, to pass from the annulus 31 to the interior of tubing 34. At the start of the unloading process all of these lift gas valves are open, but none of the modules 50 can be powered since the completion fluid creates an electrical short circuit between the tubing 26 and the casing 24 at a point above all of the chokes 41, 42.

To initiate the unloading process, lift gas under pressure from a surface supply is admitted to the annulus 31, and starts to displace the completion fluid through the open lift gas valves of each of the downhole modules 40, thus driving down the level of the completion fluid. When the level of the completion fluid has reached level 2 indicated on FIG. 12, the first module 50 immediately above level 2 becomes powered and thus controllable, since the tubing and casing above level 2 are no longer electrically short-circuited above level 2. The lift gas valve associated with the module immediately above level 2 may now be regulated to control the flow of lift gas into the tubing 34. The rising column of lift gas bubbles lightens the liquid column between this first valve and the surface, inducing upwards flow in the production tubing. At this point in the unloading process therefore, the uppermost lift gas valve is passing gas under control from commands sent from surface equipment 44, and the other lift gas valves are open to pass completion fluid but cannot yet be controlled.

Completion fluid continues to be expelled through the lower open valves until the completion fluid level reaches level 3. The module 50 immediately above level 3 becomes powered and controllable as described with reference to the valve at level 2, so that lift gas flow through the valve at level 3 may now be regulated by commands sent from the surface. Once this flow is established, the lift gas valve at level 2 may be closed, and lift of fluids in the tubing 34 is thus transferred from level 2 to level 3.

In like manner, as the completion fluid continues to be expelled and its surface passes levels 4 and 5, the gas lift valves at these levels become powered and controllable at progressively greater depths. As gas lift progresses down the tubing, the valves above are closed to conserve lift gas, which is directed to only the lowermost lifting valve. At the end of the unloading process, only the gas lift valve at choke 32 is open, and all valves above it are closed.

This method for controlling the unloading process ensures that each valve is closed at the correct moment. In existing practice and without benefit of means to control directly the lift gas valves, the cycling of the intermediate valves between open and closed is implemented by using pre-set opening and closing pressures. These preset values are chosen using design calculations which are based on incomplete or uncertain data. The consequence is that in existing practice the valves frequently open and close at inappropriate times, causing lift instability, excessive wear or total destruction of the valves, and also inefficiencies in lift gas usage from the need to specify the valve presets with pressure margins which reduce the range of gas pressures which can be made available for lift during the unloading and production processes.

A large percentage of the artificially lifted oil production today uses gas-lift to help bring the reservoir oil to the surface. In such gas-lift wells, compressed gas is injected downhole outside the tubing, usually in the annulus between the casing and the tubing and mechanical gas-lift valves permit communication of the gas into the tubing section and the rise of the fluid column within the tubing to the surface. Such mechanical gas-lift valves are typically mechanical bellows-type devices (see FIG. 1) that open and close when the fluid pressure exceeds the pre-charge in the bellows section. Unfortunately, a leak in the bellows is common and renders the bellows-type valve largely inoperative once the bellows pressure departs from its pre-charge setting unless the bellows fails completely, i.e. rupture, in which case the valve fails closed and is totally inoperative. Further, a common source of failure in such bellows-type valve is the erosion and deterioration of the ball valve against the seat as the ball and seat contact frequently during normal operation in the often briney, high temperature, and high pressure conditions around the ball valve. Such leaks and failures are not readily detectable at the surface and probably reduce a well's production efficiency on the order of 15 percent through lower production rates and higher demands on the field lift gas compression systems.

The controllable gas-lift well of the present invention has a number of data monitoring pods and controllable gas-lift valves on the tubing string, the number and type of each pod and controllable valves depends on the requirements of the individual well. Each of the individual data monitoring pods and controllable valves is individually addressable via wireless spread spectrum communication through the tubing and casing. That is, a master spread spectrum modem at the surface and an associated controller communicates to a number of slave modems. The data monitoring pods report such measurements as downhole tubing pressures, downhole casing pressures, downhole tubing and casing temperatures, lift gas flow rates, gas valve position, and acoustic data (see FIG. 6, sensors 112, 114, 116, and 118). Such data is similarly communicated to the surface through a slave spread spectrum modem communicating through the tubing and casing.

The surface computer (either local or centrally located) continuously combines and analyzes the downhole data as well as surface data, to compute a real-time tubing pressure profile. An optimal gas-lift flow rate for each controllable gas-lift valve is computed from this data. Preferably, pressure measurements are taken at locations uninfluenced by gas-lift injection turbulence. Acoustic sensors (sounds less than approximately 20 kilohertz) listen for tubing bubble patterns. Data is sent via the slave modem directly to the surface controller. Alternatively, data can be sent to a midhole data monitoring pod and relayed to the surface computer.

In addition to controlling the flow rate of the well, production may be controlled to produce an optimum fluid flow state. Unwanted conditions such as "heading" and "slug flow" can be avoided. As previously mentioned, it is possible to attain and maintain the most desirable flow regime. By being able to determine such unwanted bubble flow conditions quickly downhole, production can be controlled to avoid such unwanted conditions. A fast detection of flow conditions allows the correction of any flow problems by adjusting such factors as the position of the controllable gas-lift valve, the gas injection rate, back pressure on tubing at the wellhead, and even injection of surfactant.

Even though many of the examples discussed herein are applications of the present invention in petroleum wells, the present invention also can be applied to other types of wells, including but not limited to water wells and natural gas wells.

One skilled in the art will see that the present invention can be applied in many areas where there is a need to provide a controllable valve within a borehole, well, or any other area that is difficult to access. Also, one skilled in the art will see that the present invention can be applied in many areas where there is an already existing conductive piping structure and a need to route power and communications to a controllable valve in a same or similar path as the piping structure. A water sprinkler system or network in a building for extinguishing fires is an example of a piping structure that may be already existing and may have a same or similar path as that desired for routing power and communications to a controllable valve. In such case another piping structure or another portion of the same piping structure may be used as the electrical return. The steel structure of a building may also be used as a piping structure and/or electrical return for transmitting power and communications to a valve in accordance with the present invention. The steel rebar in a concrete dam or a street may be used as a piping structure and/or electrical return for transmitting power and communications to a controllable valve in accordance with the present invention. The transmission lines and network of piping between wells or across large stretches of land may be used as a piping structure and/or electrical return for transmitting power and communications to a controllable valve in accordance with the present invention. Surface refinery production pipe networks may be used as a piping structure and/or electrical return for transmitting power and communications to a controllable valve in accordance with the present invention. Thus, there are numerous applications of the present invention in many different areas or fields of use.

It should be apparent from the foregoing that an invention having significant advantages has been provided. While the invention is shown in only a few of its forms, it is not just limited but is susceptible to various changes and modifications without departing from the spirit thereof.

We claim:

1. A controllable gas-lift well, comprising:
   a wellbore extending from a first location to a second location;
   a production tubing positioned and longitudinally extending within the wellbore;
   an AC power supply electrically coupled to the production tubing near the first location and operable for supplying an AC signal along the production tubing towards the second location;
   a gas-lift valve coupled to the production tubing between the first location and the second location, the valve being adjustable to regulate the fluid flow between an interior and an exterior of the tubing, the valve being electrically controllable by using the production tubing as a conductor; and
   a lower impedance device coupled to the tubing, the controllable gas-lift valve being electrically coupled to the tubing above the lower impedance device.

2. The gas-lift well of claim 1, wherein:
   the wellbore begins at a surface of the well; and
   the first location is the surface of the well.

3. The gas-lift well of claim 1, further comprising:
   a first modem coupled to the tubing at the first location; and
   wherein the controllable gas-lift valve includes a second modem, the first modem communicating with the second modem using the tubing.

4. The gas-lift well of claim 1, further comprising an impedance device coupled to the tubing proximate the first location and acting as an impedance to current flow along the tubing.

5. The gas-lift well of claim 1, further comprising:
   an impedance device coupled to the tubing proximate the first location and acting as an impedance to current flow along the tubing; and
   wherein the lower impedance device is a lower ferromagnetic choke coupled to the tubing below an upper ferromagnetic choke, the controllable gas-lift valve being electrically coupled to the tubing between the upper and lower ferromagnetic chokes.

6. The gas-lift well of claim 1, further comprising:
   an upper impedance device coupled to the tubing proximate the first location and acting as an impedance to current flow along the tubing;
   wherein the lower impedance device is a lower ferromagnetic choke coupled to the tubing below the upper impedance device and nearer to the second location than the upper device;
   a first modem operatively coupled to the tubing below the upper impedance device;
   a second modem electrically coupled to the tubing above the lower ferromagnetic choke and electrically coupled to the controllable gas-lift valve; and
   wherein the controllable gas-lift valve is controlled by signals transmitted along the tubing between the first modem and the second modem.

7. The gas-lift well of claim 1, further comprising:
   an upper impedance device coupled to the tubing proximate the first location and acting as an impedance to current flow along the tubing; and
   wherein the controllable gas-lift valve is grounded to the tubing below the lower impedance device.

8. The gas-lift well of claim 1, further comprising:
   an upper ferromagnetic choke coupled to the tubing proximate the first location and acting as an impedance to current flow along the tubing;
   the lower impedance device is a lower ferromagnetic choke coupled to the tubing, the controllable gas-lift valve being electrically coupled to the tubing above the lower ferromagnetic choke; and
   wherein the controllable gas-lift valve is grounded to a formation surrounding the wellbore.

9. A controllable gas-lift well, comprising:
   a wellbore extending into the earth from the surface;
   a production tubing positioned and longitudinally extending within the wellbore;
   a gas-lift valve coupled to the production tubing in the wellbore, the valve being electrically adjustable to regulate the fluid flow between an interior and an exterior of the tubing, wherein the valve is powered and controlled by using the production tubing as an electrical conductor; and
   a lower impedance device coupled to the tubing, the controllable gas-lift valve being electrically coupled to the tubing.

10. The gas-lift well of claim 9, further comprising an impedance device coupled to the tubing proximate the first location and acting as an impedance to current flow along the tubing.

11. The gas-lift well of claim 9, including a plurality of valves coupled to the tubing and longitudinally spaced thereon.

12. The gas-lift well of claim 11, the valves being individually addressable and controllable for independent operation.

13. The gas-lift well of claim 9, including one or more sensors positioned in the wellbore and powered by using the tubing as an electrical conductor.

14. The gas-lift well of claim 13, one of the valves being operable in response to measurements from at least one sensor.

15. A controllable gas-lift well, comprising:
   a wellbore extending from a first location to a second location;
   a casing positioned and longitudinally extending within the wellbore;
   a production tubing string positioned and longitudinally extending within the casing; a controllable gas-lift valve coupled to the production tubing string between the first location and the second location, the valve being electrically adjustable to regulate the fluid flow between an interior and an exterior of the tubing string, the valve being coupled to receive electrical signals by using the tubing string as a first conductor and the casing as a second conductor; and a lower impedance device coupled to the tubing, the controllable gas-lift valve being electrically coupled to the tubing above the lower impedance device.

16. The gas-lift well of claim 15, the signals comprising communication signals for controlling the operation of the controllable gas-lift valve.

17. The gas-lift well of claim 16, further comprising:

a surface modem coupled to the tubing string; and wherein the controllable gas-lift valve includes a modem for communicating with the surface modem using the tubing string.

18. The gas-lift well of claim 15, wherein the controllable gas-lift valve is grounded to the casing through a conductor connected to a centralizer around the tubing string.

19. The gas-lift well of claim 15, wherein the controllable gas-lift valve is disposed on the tubing string in a wireline replaceable, side-pocket mandrel.

20. The gas-lift well of claim 15, further comprising one or more sensors coupled to the tubing string proximate the controllable gas-lift valve.

21. The gas-lift well of claim 15, wherein the controllable gas-lift valve includes a programmable interface controller.

22. The gas-lift well of claim 15, wherein the controllable gas-lift valve includes a power supply adapted for receiving current input from the tubing string.

23. The gas-lift well of claim 15, wherein the controllable gas-lift valve includes a sensor for determining a downhole physical characteristic of the well.

24. The gas-lift well of claim 23, the sensor comprising a temperature sensor.

25. The gas-lift well of claim 23, the sensor comprising a pressure sensor.

26. The gas-lift well of claim 23, the sensor comprising an acoustic sensor.

27. The gas-lift well of claim 23, the sensor being electrically connected to the tubing string for receiving current from the first location along the tubing string.

28. The gas-lift well of claim 23, the sensor comprising a fluid flow sensor.

29. The gas-lift well of claim 23, the sensor being connected to a modem in communication with a surface modem along the tubing.

30. The gas-lift well of claim 15, further comprising a plurality of mechanical, bellows-type gas-lift valves coupled to the tubing and longitudinally spaced thereon.

31. The gas-lift well of claim 15, further comprising a plurality of controllable gas-lift valves coupled to the tubing and longitudinally spaced thereon.

32. The gas-lift well of claim 15, further comprising an impedance device comprising an upper ferromagnetic choke coupled to the tubing string proximate the first location and acting as an impedance to current flow along the tubing string.

33. The gas-lift well of claim 15, further comprising:

an impedance device coupled to the tubing string proximate the first location and acting as an impedance to current flow along the tubing string; and a surface power supply electrically coupled to the tubing string below the upper ferromagnetic choke.

34. The gas-lift well of claim 15, further comprising:

an impedance device coupled to the tubing string proximate the first location and acting as an impedance to current flow along the tubing string; and wherein the lower impedance device is a lower ferromagnetic choke.

35. The gas-lift well of claim 15, further comprising:

an impedance device coupled to the tubing string proximate the first location and acting as an impedance to current flow along the tubing string; and a surface modem operatively coupled to the tubing string below the upper ferromagnetic choke.

36. The gas-lift well of claim 15, further comprising:

an impedance device coupled to the tubing string proximate the first location and acting as an impedance to current flow along the tubing string;

a surface modem operatively coupled to the tubing string below the impedance device; and a computer coupled to the surface modem for communicating with the controllable gas-lift valve and controlling the operation thereof.

37. The gas-lift well of claim 15, further comprising:

a modem electrically coupled to the tubing string;

one or more downhole sensors in operative communication with the controller; and a controller coupled to the modem for communicating with the sensors and the controllable gas-lift valve for controlling the operation of the valve in response to measurements from the one or more sensors.

38. The gas-lift well of claim 15, further comprising:

an upper impedance device coupled to the tubing string proximate the first location and acting as an impedance to current flow along the tubing string;

a surface modem operatively coupled to the tubing string below the upper impedance device;

a computer coupled to the surface modem for communicating with the controllable gas-lift valve and controlling the operation thereof; and one or more surface condition sensors in operative communication with the computer.

39. A method of operating a gas-lift well comprising the steps of:

providing an upper impedance device effective to act as impedance to current flow past the upper impedance device;

inputting an AC signal to a production tubing string below the upper impedance device, the production tubing string positioned within and longitudinally extending along a borehole of the well, the borehole extending from a surface of the well to a downhole location; and operating a gas-lift valve coupled to the production tubing string using said input AC signal to said production tubing string to control the amount of lift gas flowing from outside the production tubing string to the inside of the production tubing string to assist in lifting oil from said downhole location towards the surface.

40. The method of claim 39, the inputting step comprising applying a power signal to the tubing below the upper impedance device.

41. The method of claim 39, the inputting step comprising applying a communications signal to the tubing below the upper impedance device.

42. The method of claim 39, the operating step comprising unloading the gas-lift well.

43. The method of claim 39, the operating step comprising producing oil from the gas-lift well.

44. The method of claim 42, the unloading step comprising serially activating a plurality of gas-lift valves spaced along the tubing string to drive the gas in the annulus to a location in the borehole proximate an oil-bearing region.

45. The method of claim 44, including closing the valves spaced from the oil-bearing region and using a valve proximate the oil-bearing region to throttle lift gas from the annulus into the tubing.

46. The method of claim 39, further comprising the step of providing a casing positioned and longitudinally extending within the borehole, the casing being spaced radially outside of said tubing string.

47. The method of claim 39, further comprising the steps of:
providing a casing positioned and longitudinally extending within the borehole, the casing being spaced radially outside of said tubing string; and
providing centralizers between said tubing string and casing having a non-conductive component to at least partially electrically isolate said casing from said tubing string.

48. The method of claim 40, further comprising the steps of:
providing a casing positioned and longitudinally extending within the borehole, the casing being spaced radially outside of said tubing string; and
wherein the inputting step includes the substep of inducing current to the tubing string and using the casing as the return.

49. The method of claim 40, further comprising the step of impeding the current flow of the input power along regions of the tubing string.

50. The method of claim 39, wherein the upper impedance device is an upper ferromagnetic choke.

51. The method of claim 39, further comprising the step of coupling a lower ferromagnetic choke to the tubing substantially spaced below the surface in the borehole.

52. The method of claim 41, further comprising the step of providing a surface modem coupled to said tubing string and communicating with said gas-lift valve using the tubing string as a conductor.

53. The method of claim 39, further comprising the step of operating one or more sensors in the borehole and communicating to the surface of the well using said tubing as a conductor.

54. The method of claim 53, wherein one or more of the sensors is a pressure sensor.

55. The method of claim 53, wherein one or more of the sensors indicates a position of the controllable gas-lift valve.

56. The method of claim 53, further comprising the steps of:
providing a controller operably connected to the tubing string; and
determining a desired operation of said gas-lift valve using measurements from one or more of the sensors.

57. The method of claim 56, wherein said controller includes a surface computer and uses the oil output of said well as a measurement to determine the desired operation of the gas-lift valve.

58. The method of claim 56, including the steps of measuring the compressed gas input to said well, determining the desired operation of the gas-lift valve, controlling the operation of the gas-lift valve using at least in part the measurement of the compressed gas.

59. A gas-lift valve adapted to be coupling to a production tubing string, the gas-lift valve comprising:
a housing having an inlet and an outlet;
a modem adapted to be electrically coupled to the tubing string for receiving an AC communication signal from the production tubing string;
an upper impedance device effective to act as impedance to current flow past the upper impedance device;
a power supply adapted to be electrically coupled to the production tubing string for receiving power input to the production tubing string below the upper impedance device;
a mechanical valve head positioned within the housing and being adjustable for metering the amount of fluid flow between the inlet and outlet of the housing; and
a controller operably connected to the modem, the valve head, and the power supply for adjusting the valve head in response to an AC communication signal received by the modem along the production tubing string.

60. The gas-lift valve of claim 59, further comprising a motor connected to said valve head for moving said valve head to any one of a plurality of positions between an open position and a closed position, the open position of the valve head allowing full fluid communication between the inlet and the outlet, the closed position preventing fluid communication between the inlet and the outlet.

61. The gas-lift valve of claim 59, wherein the housing is adapted for wireline insertion and retrieval from a side-pocket mandrel on the tubing string.

62. The gas-lift valve of claim 59, further comprising one or more sensors electrically coupled to the modem.

63. The gas-lift valve of claim 59, further comprising:
one or more sensors electrically coupled to the modem; and
wherein one or more of the sensors is a pressure sensor for determining a fluid pressure external to the tubing string.

64. The gas-lift valve of claim 59, further comprising:
one or more sensors electrically coupled to the modem; and
wherein one or more of the sensors is a pressure sensor for determining a fluid pressure internal to the tubing string.

65. The gas-lift valve of claim 59, further comprising:
one or more sensors electrically coupled to the modem; and
wherein one or more of the sensors is a pressure sensor for determining the difference between a fluid pressure external to the tubing string and a fluid pressure internal to the tubing string.

66. The gas-lift valve of claim 59, further comprising:
one or more sensors electrically coupled to the modem; and
wherein one or more of the sensors is a temperature sensor.

67. The gas-lift valve of claim 59, further comprising:
one or more sensors electrically coupled to the modem; and
wherein one or more of the sensors is a fluid flow sensor.

68. The gas-lift valve of claim 59, further comprising:
one or more sensors electrically coupled to the modem; and
wherein one or more of the sensors is an acoustic sensor.

* * * * *